United States Patent
Zhang et al.

(10) Patent No.: US 12,256,241 B2
(45) Date of Patent: Mar. 18, 2025

(54) COMMUNICATION METHOD AND APPARATUS

(71) Applicant: HUAWEI TECHNOLOGIES CO., LTD., Shenzhen (CN)

(72) Inventors: Hongping Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/896,178

(22) Filed: Aug. 26, 2022

(65) Prior Publication Data

US 2022/0408282 A1 Dec. 22, 2022

Related U.S. Application Data

(63) Continuation of application No. PCT/CN2021/075816, filed on Feb. 7, 2021.

(30) Foreign Application Priority Data

Mar. 6, 2020 (CN) .......................... 202010153427.0

(51) Int. Cl.
*H04L 5/00* (2006.01)
*G06N 20/00* (2019.01)
(Continued)

(52) U.S. Cl.
CPC ........... *H04W 24/02* (2013.01); *H04W 24/10* (2013.01)

(58) Field of Classification Search
CPC ..... H04W 67/12; H04W 24/02; H04W 12/08; H04W 24/04; H04W 24/10; H04W 24/08;
(Continued)

(56) References Cited

U.S. PATENT DOCUMENTS 10,039,016 B1 * 7/2018 Larish .................... H04W 24/02
10,824,664 B2 * 11/2020 Zu ............................ G10L 15/26
(Continued)

FOREIGN PATENT DOCUMENTS

CN 105519177 A 4/2016
CN 108401510 A 8/2018
(Continued)

OTHER PUBLICATIONS

Qi Sun China Mobile PR China: "Framework for data handling to enable Machine Learning in future networks Including IMT 2020;ML5G I-148-R1", May 1, 2019, pp. 1-36, XP044267625.
(Continued)

*Primary Examiner* — Edan Orgad
*Assistant Examiner* — Vanneilian Lalchinthang
(74) *Attorney, Agent, or Firm* — HAUPTMAN HAM, LLP

(57) ABSTRACT

A core network element includes a processor, and a non-transitory memory coupled to the processor. The non-transitory memory is configured to store non-transitory instructions, and in response to being executed by the processor, cause the core network element to perform operations including generating, by a first artificial intelligence (AI) protocol layer of the core network element, an AI parameter. The first AI protocol layer of the core network element is an upper layer of a next generation application protocol (NGAP) protocol layer of the core network element. The operations further include sending the AI parameter to a first access network device, and receiving the AI data from the first access network device. The AI parameter is useable for indicating AI data that is to be obtained and an obtaining manner of the AI data.

13 Claims, 10 Drawing Sheets

(51) Int. Cl.
  *G06N 99/00*   (2019.01)
  *H04B 7/06*    (2006.01)
  *H04W 24/02*   (2009.01)
  *H04W 24/10*   (2009.01)

(58) Field of Classification Search
  CPC ..... H04W 8/24; H04W 76/10; H04J 11/0073;
         H04J 11/0079; G06N 3/0445; G06N 3/10;
         G06N 3/045; G06N 3/105; G06N 99/055;
         G06N 20/00; G06N 3/084; H04B 7/0413;
         H04B 7/088; H04L 63/102; H04L 41/16;
         H04L 1/1819
  USPC .......................................................... 370/252
  See application file for complete search history.

(56) References Cited

U.S. PATENT DOCUMENTS

| | | | | |
|---|---|---|---|---|
| 11,201,784 B2* | 12/2021 | Peng | ........................ | H04L 41/16 |
| 11,271,699 B1* | 3/2022 | Eyuboglu | .............. | H04L 1/1819 |
| 11,317,302 B2* | 4/2022 | Hong | ..................... | H04W 24/10 |
| 12,120,774 B2* | 10/2024 | Tomala | .................. | G06N 20/00 |
| 2017/0353991 A1* | 12/2017 | Tapia | ...................... | G06Q 10/20 |
| 2019/0138908 A1* | 5/2019 | Bernat | ................... | G06N 3/105 |
| 2019/0141580 A1* | 5/2019 | Oktay | ................... | H04W 24/08 |
| 2021/0116907 A1* | 4/2021 | Altman | ............. | B60W 60/0015 |
| 2023/0004864 A1* | 1/2023 | Wang | ..................... | G06N 20/00 |

FOREIGN PATENT DOCUMENTS

| | | |
|---|---|---|
| CN | 110474985 A | 11/2019 |
| WO | 2021048600 A1 | 3/2021 |
| WO | 2021128110 A1 | 7/2021 |

OTHER PUBLICATIONS

Huawei, (TP for BL CR for TS 38.423): Adding UE History Information in Retrieve UE Context. 3GPP TSG-RAN3 Meeting #102, Spokane, US, Nov. 12-16, 2018, R3-186487, 3 pages.

3GPP TS 36.413 V15.7.1 (Oct. 2019), 3rd Generation Partnership Project; Technical Specification Group Radio Access Network; Evolved Universal Terrestrial Radio Access Network (E-Utran); S1 Application Protocol (S1AP)(Release 15), 388 pages.

International Search Report issued in corresponding International Application No. PCT/CN2021/075816, dated May 6, 2021, pp. 1-9.

* cited by examiner

COMMUNICATION METHOD AND APPARATUS

This application is a continuation of International Application No. PCT/CN2021/075816, filed on Feb. 7, 2021, which claims priority to Chinese Patent Application No. 202010153427.0, filed on Mar. 6, 2020, both of which are herein incorporated by reference in their entireties.

TECHNICAL FIELD

This application relates to the communication field, and in particular, to a communication method and apparatus.

BACKGROUND

To improve management efficiency of an increasingly complex wireless network, an artificial intelligence (AI) technology may be introduced into a core network, to implement intelligentization of the core network. For example, the AI technology is used to implement continuous and dynamic self-optimization of the core network based on different time, locations, and services.

Currently, a base station receives a minimization of drive tests (MDT) parameter from the core network by using an initial context setup request message or a trace start message, and sends the MDT parameter to a terminal device. Then, the base station receives an MDT report from the terminal device, and sends the MDT report to a specified entity, to implement self-optimization or self-organizing management of the core network. However, the MDT parameter is configured for an MDT requirement, and data in the MDT report is also data for the MDT requirement. Consequently, if data is also obtained in a manner similar to MDT, due to a limitation of an existing protocol layer procedure, for example, a next generation application protocol (NGAP) layer procedure, an AI parameter cannot be flexibly configured, various types of AI training requirements cannot be met, and a problem that obtained AI data is insufficient and of a single type may be caused. This causes poor accuracy and low efficiency of AI training.

SUMMARY

At least one or more embodiments of the present application provide a communication method and apparatus, to resolve a problem that flexibility of an AI function is poor because the AI function is bound to an existing protocol layer procedure.

To achieve at least the foregoing objective, the following technical solutions are used in one or more embodiments of the present application.

According to a first aspect, a communication method is provided. The communication method includes: A first artificial intelligence AI protocol layer of a core network element generates an AI parameter. The first AI protocol layer of the core network element is an upper layer of a next generation application protocol NGAP protocol layer of the core network element. Then, the core network element sends the AI parameter to a first access network device. The AI parameter is for indicating AI data that needs to be obtained and an obtaining manner of the AI data. Then, the core network element receives the AI data from the first access network device.

Based on the communication method provided in the first aspect, an independent AI protocol layer is introduced above an existing protocol layer of the core network element, so that a type of an AI function and a quantity of AI functions supported by the core network element can be flexibly adjusted based on an actual AI training requirement. For example, a new AI function is introduced, or an original AI function is modified, deleted, or recombined. In addition, a communication function of the core network element can be separated from the AI function of the core network element. For example, AI functions such as generating the AI parameter, receiving and parsing the AI data reported by the first access network device, and completing a network optimization operation based on the AI data are completed by the AI protocol layer of the core network element. However, an original protocol layer of the core network element, for example, the NGAP protocol layer, only needs to implement the communication function, and does not need to perform an AI function-related operation. In this way, a problem that the AI function is bound to an existing NGAP protocol layer procedure such as minimization of drive tests because the AI function is completed through the existing NGAP protocol layer procedure can be resolved. Therefore, diversity and flexibility of the AI function supported by the core network element are improved, and network performance of the core network element is improved. In addition, the original protocol layer does not need to be modified, and a technical difficulty in implementing the AI function is low, so that an existing protocol is not affected, and device development costs and network deployment costs can be effectively reduced.

In addition, the AI parameter is determined based on the AI training requirement. Therefore, the AI data obtained based on the AI parameter can meet various actual requirements of AI training on a data type, a data volume, and the like, and problems such as a single data type, insufficient data, and a failure to select a data source that are caused by completing the AI function through the existing protocol layer procedure can be resolved, so that the network performance and running efficiency of the core network element are further improved.

In some embodiments, after the first artificial intelligence AI protocol layer of the core network element generates the AI parameter, the communication method provided in the first aspect may further include: The first AI protocol layer of the core network element encapsulates the AI parameter into a first AI protocol data unit AI PDU, and sends the first AI PDU to the NGAP protocol layer of the core network element. Then, the NGAP protocol layer of the core network element may add encapsulation information of the NGAP protocol layer to the first AI PDU and send the first AI PDU. In this way, the AI protocol layer of the core network element can be separated from the existing protocol layer of the core network element, so that the flexibility of the AI function supported by the core network element can be improved. In addition, the existing protocol layer does not need to perform an AI-related operation, so that impact of the AI function on the communication function can be reduced, and technical complexity of the core network element can be reduced, to reduce development costs and deployment costs of the core network element.

In some embodiments, the AI parameter may include a first AI parameter. The first AI parameter is sent by using an NGAP protocol layer message that is not associated with a terminal device. Because the NGAP protocol layer message that is not associated with the terminal device does not specify obtaining of AI data of a specific terminal device, the first AI parameter is for obtaining management-based AI data, and a terminal device that reports the AI data is not limited. In this way, the core network element may perform artificial intelligence analysis based on a statistical result that is of AI data of a plurality of terminal devices and that is reported by the first access network device. This can not only resolve a problem that the core network element cannot obtain management-based (management-based) AI data, but also implement self-optimization of the core network element and improve an intelligence level of the core network element, so that the network performance and the running efficiency of the core network element are improved.

Further, the first AI parameter may include a reporting content configuration. The reporting content configuration may include one or more of the following: a serving cell measurement result and/or a beam measurement result, radio link failure information, connection setup failure information, an uplink transmission delay, a downlink transmission delay, and a data transmission volume. In this way, the reporting content configuration may be for indicating specific AI data to be reported by the first access network device to the core network element, including whether to report location information, so that the core network element completes network optimization based on the received AI data.

For example, the first AI parameter may further include a reporting occasion configuration. The reporting occasion configuration may include a reporting trigger condition and a reporting periodicity. For example, the reporting trigger condition may include: reporting when load of a cell is higher than a specified threshold, reporting when a quantity of users that are in a connected state in the cell is higher than or lower than a specified threshold, or reporting at a specified time point. The reporting periodicity indicates that specified data is reported based on the specified periodicity.

For example, the first AI parameter may further include a user selection configuration. The user selection configuration is for indicating a condition that needs to be met by a to-be-selected terminal device. For example, the user selection configuration may include: selecting a terminal device in a specified cell list range, selecting a terminal device of a specified type, selecting a terminal device whose serving cell signal quality is higher than or lower than a specific threshold, selecting a specific quantity of terminal devices, or selecting a specific proportion of terminal devices. In other words, the user selection configuration may be for indicating the first access network device to select, based on the user selection configuration, a terminal device that meets the condition, collect or obtain AI data, and then report the AI data to the core network element, so that the core network element completes network optimization based on the AI data.

For example, the first AI parameter may further include an anonymization configuration. The anonymization configuration may include information indicating whether the AI data is reported anonymously, and/or an anonymization level configuration. In some embodiments, if the AI data is anonymously reported, the anonymization level configuration may include no user ID or include an anonymized ID, for example, a mobile station identification code software version (international mobile equipment identity software version, IMEI-SV). In this way, the core network element may indicate the first access network device whether to anonymously report the AI data of the terminal device, to protect user privacy.

In some embodiments, the core network element may send privacy restriction information of the terminal device to the first access network device. The privacy restriction information includes one or more of the following: whether collection of data of the terminal device is allowed, whether the data of the terminal device is anonymous, anonymization level information, and whether collection of location information of the terminal device is allowed. In this way, the core network element may send the privacy restriction information of the terminal device to the first access network device, so that the first access network device selects, based on the privacy restriction information, a terminal device that meets a condition. This can skip a step of obtaining the privacy restriction information from the terminal device, reduce a quantity of signaling interaction times, and reduce signaling resources, so that AI training efficiency is further improved.

In some embodiments, the privacy restriction information is sent by using an initial context setup request message. In this way, the first access network device may use the privacy restriction information when subsequently selecting the terminal device.

In some embodiments, the AI parameter may further include a second AI parameter. The second AI parameter is for obtaining AI data of a specific terminal device, and the second AI parameter is sent by using an NGAP protocol layer message that is associated with the terminal device. The second AI parameter limits the terminal device that reports the AI data, for example, limits a type, a service type, a location, and received signal quality and/or strength of the terminal device. In this way, the core network element receives the AI data of the specific terminal device from the first access network device, and configures a more appropriate parameter for the terminal device after performing artificial intelligence analysis on the AI data, so that communication performance of the specific terminal device can be improved.

According to a second aspect, a communication method is provided. The communication method includes: A first access network device receives an artificial intelligence AI parameter from a core network element. The AI parameter is for indicating AI data that needs to be obtained and an obtaining manner of the AI data. Then, a first AI protocol layer of the first access network device obtains the AI data based on the AI parameter. The first AI protocol layer of the first access network device is an upper layer of a next generation application protocol NGAP protocol layer of the first access network device. Then, the first access network device sends the AI data to the core network element.

In some embodiments, after the first AI protocol layer of the first access network device obtains the AI data based on the AI parameter, the communication method provided in the second aspect may further include: The first AI protocol layer of the first access network device encapsulates the AI data into a second AI protocol data unit AI PDU, and sends the second AI PDU to the NGAP protocol layer of the first access network device. Then, the NGAP protocol layer of the first access network device adds encapsulation information of the NGAP protocol layer to the second AI PDU and sends the second AI PDU. In this way, an AI protocol layer of the first access network device can be separated from an existing protocol layer of the first access network device, so that flexibility of an AI function supported by the first access network device can be improved. In addition, the existing protocol layer does not need to perform an AI-related operation, so that impact of the AI function on a communication function can be reduced, and technical complexity of the first access network device can be reduced, to reduce development costs of the first access network device.

In some embodiments, the AI parameter may include a first AI parameter, and the first AI parameter is received by using an NGAP protocol layer message that is not associated with a terminal device. In other words, because the NGAP protocol layer message that is not associated with the terminal device does not specify obtaining of AI data of a specific terminal device, the first AI parameter is for obtaining management-based AI data, and a terminal device that reports the AI data is not specified. In this way, the first access network device may collect AI data of a plurality of terminal devices based on the first AI parameter and perform statistics collection, and then send a statistical result to the core network element, so that the core network element obtains management-based AI data, to implement self-optimization of the core network element, and improve an intelligence level of the core network element. Therefore, network performance and running efficiency of the core network element are improved.

Further, the first AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume. In this way, the first access network device may collect or obtain, based on the reporting content configuration, AI data that meets a condition, and send the AI data to the core network element, so that the core network element completes network optimization based on the AI data.

For example, the first AI parameter may further include a reporting occasion configuration. The reporting occasion configuration may include a reporting trigger condition and a reporting periodicity. For example, the reporting trigger condition may include: reporting when load of a cell is higher than a specified threshold, reporting when a quantity of users that are in a connected state in the cell is higher than or lower than a specified threshold, or reporting at a specified time point. The reporting periodicity indicates that specified data is reported based on the specified periodicity.

For example, the first AI parameter may further include a user selection configuration. The user selection configuration is for indicating a condition that needs to be met by a to-be-selected terminal device. For example, the user selection configuration may include: selecting a terminal device in a specified cell list range, selecting a terminal device of a specified type, selecting a terminal device whose serving cell signal quality is higher than or lower than a specific threshold, selecting a specific quantity of terminal devices, or selecting a specific proportion of terminal devices. In other words, the first access network device may select, based on the user selection configuration, a terminal device that meets the condition, collect or obtain AI data, and then report the AI data to the core network element, so that the core network element completes network optimization based on the AI data.

For example, the first AI parameter may further include an anonymization configuration. The anonymization configuration may include information indicating whether the AI data is reported anonymously, and/or an anonymization level configuration. In some embodiments, if the AI data is anonymously reported, the anonymization level configuration may include no user ID or include an anonymized ID, for example, a mobile station identification code software version (IMEI-SV). In this way, the first access network device may determine, based on the anonymization configuration, whether to anonymously report the AI data of the terminal device, so that user privacy can be protected.

In some embodiments, the first access network device may receive privacy restriction information of the terminal device from the core network element. The privacy restriction information includes one or more of the following: whether collection of data of the terminal device is allowed, whether the data of the terminal device is anonymous, anonymization level information, and whether collection of location information of the terminal device is allowed. In this way, the first access network device may select, based on the privacy restriction information, a terminal device that meets a condition. This can skip a step of obtaining the privacy restriction information from the terminal device, reduce a quantity of signaling interaction times, and reduce signaling resources, so that AI training efficiency is further improved.

In some embodiments, the privacy restriction information may be received by using an initial context setup request message. In this way, the first access network device may use the privacy restriction information when subsequently selecting the terminal.

In some embodiments, the communication method provided in the second aspect may further include: The first access network device sends a handover request message to a second access network device. The handover request message carries the privacy restriction information. In this way, the second access network device does not need to obtain the privacy restriction information from the core network element, so that a quantity of signaling interaction times can be reduced, and signaling resources can be reduced. Therefore, AI training efficiency is further improved.

In some embodiments, the AI parameter may further include a second AI parameter. The second AI parameter is for obtaining AI data of a specific terminal device, and the second AI parameter is sent by using an NGAP protocol layer message that is associated with the terminal device. The second AI parameter limits the terminal device that reports the AI data, for example, limits a type, a service type, a location, and received signal quality and/or strength of the terminal device. In this way, the first access network device may forward the second AI parameter to the specific terminal device, obtain the AI data of the specific terminal device, and then forward the AI data of the specific terminal device to the core network element. After performing artificial intelligence analysis on the AI data, the core network element configures a more appropriate parameter for the terminal device, so that communication performance of the specific terminal device can be improved.

In some embodiments, the first access network device may include a radio access network intelligent controller (RIC) and a centralized unit (CU). The first AI protocol layer of the first access network device is located in the RIC or the CU. The RIC is used for AI function-related communication between the first access network device and the core network element, and the CU is used for communication between the first access network device and the core network element, and communication between the first access network device and the terminal device.

It should be understood that the first access network device may alternatively use another physical architecture. For example, the first access network device includes a CU and a DU, and the AI layer of the first access network device is located in the CU; or the first access network device is not divided into a CU and a DU, in other words, both the AI layer and an original protocol layer of the first access network device are located in a same physical device. An implementation of the first access network device is not specifically limited in this embodiment of this application.

In addition, for technical effects of the communication method provided in the second aspect, refer to the technical effects of the communication method provided in the first aspect. Details are not described herein again.

According to a third aspect, a communication method is provided. The communication method includes: A second artificial intelligence AI protocol layer of a core network element generates an AI parameter. The second AI protocol layer of the core network element is an upper layer of a non-access stratum NAS protocol layer of the core network element. Then, the core network element sends the AI parameter to a terminal device. The AI parameter is for indicating AI data that needs to be obtained and an obtaining manner of the AI data. Then, the core network element receives the AI data from the terminal device.

In some embodiments, after the second artificial intelligence AI protocol layer of the core network element generates the AI parameter, the communication method provided in the third aspect may further include: The second AI protocol layer of the core network element encapsulates the AI parameter into a third AI protocol data unit AI PDU, and sends the third AI PDU to the NAS protocol layer of the core network element. Then, the NAS protocol layer of the core network element may add encapsulation information of the NAS protocol layer to the third AI PDU and send the third AI PDU. In this way, an AI protocol layer of the core network element can be separated from an existing protocol layer of the core network element, so that flexibility of an AI function supported by the core network element can be improved. In addition, the existing protocol layer does not need to perform an AI-related operation, so that impact of the AI function on a communication function can be reduced, and technical complexity of the core network element can be reduced, to reduce development costs and deployment costs of the core network element.

In some embodiments, the AI parameter may include a third AI parameter. The third AI parameter is for obtaining the AI data of the terminal device, and the third AI parameter is sent by using a dedicated NAS protocol layer message. The third AI parameter limits the terminal device that reports the AI data, for example, limits a type, a service type, a location, and received signal quality and/or strength of the terminal device. In this way, the core network element may send the third AI parameter to the specific terminal device, directly obtain the AI data from the terminal device, perform artificial intelligence analysis, and then configure a more appropriate parameter for the terminal device, so that communication performance of the specific terminal device can be improved.

Further, the third AI parameter may include a reporting content configuration. The reporting content configuration may include one or more of the following: a serving cell measurement result and/or a beam measurement result, radio link failure information, connection setup failure information, an uplink transmission delay, a downlink transmission delay, and a data transmission volume. The reporting content configuration may be for indicating specific AI data to be reported by the terminal device to the core network element, so that the core network element completes AI training based on the AI data.

For example, the third AI parameter may further include a reporting occasion configuration. The reporting occasion configuration includes a reporting trigger condition and a reporting periodicity. For example, the reporting trigger condition may include reporting when serving cell signal quality is higher than or lower than a specified threshold. The reporting periodicity indicates that specified data is reported based on the specified periodicity.

In addition, for technical effects of the communication method provided in the third aspect, refer to the technical effects of the communication method provided in the first aspect. Details are not described herein again.

According to a fourth aspect, a communication method is provided. The communication method includes: A terminal device receives an artificial intelligence AI parameter from a core network element. The AI parameter is for indicating AI data that needs to be obtained and an obtaining manner of the AI data. Then, a second artificial intelligence AI protocol layer of the terminal device obtains the AI data based on the AI parameter. The second AI protocol layer of the terminal device is an upper layer of a non-access stratum NAS protocol layer of the terminal device. Then, the terminal device sends the AI data to the core network element.

In some embodiments, after the second artificial intelligence AI protocol layer of the terminal device obtains the AI data based on the AI parameter, the communication method provided in the fourth aspect may further include: The second AI protocol layer of the terminal device encapsulates the AI data into a fourth AI protocol data unit AI PDU, and sends the fourth AI PDU to the NAS protocol layer of the terminal device. Then, the NAS protocol layer of the terminal device adds encapsulation information of the NAS protocol layer to the fourth AI PDU and sends the fourth AI PDU. In this way, an AI protocol layer of the terminal device can be separated from an existing protocol layer of the terminal device, so that flexibility of an AI function supported by the terminal device can be improved. In addition, the existing protocol layer does not need to perform an AI-related operation, so that impact of the AI function on a communication function can be reduced, and technical complexity of the terminal device can be reduced, to reduce development costs of the terminal device.

In some embodiments, the AI parameter may include a third AI parameter. The third AI parameter is for obtaining the AI data of the terminal device, and the third AI parameter is received by using a dedicated NAS protocol layer message. The third AI parameter limits the terminal device that reports the AI data, for example, limits a type, a service type, a location, and received signal quality and/or strength of the terminal device. In other words, the terminal device may obtain and report the AI data based on the third parameter, so that the core network element configures a more appropriate parameter for the terminal device, to improve communication performance of the specific terminal device.

Further, the third AI parameter may include a reporting content configuration. The reporting content configuration may include one or more of the following: a serving cell measurement result and/or a beam measurement result, radio link failure information, connection setup failure information, an uplink transmission delay, a downlink transmission delay, and a data transmission volume. In this way, the terminal device may collect or obtain, based on the reporting content configuration, AI data that meets a condition, and send the AI data to the core network element, so that the core network element completes AI training based on the AI data.

For example, the third AI parameter may further include a reporting occasion configuration. The reporting occasion configuration includes a reporting trigger condition and a reporting periodicity. For example, the reporting trigger condition may include reporting when serving cell signal quality is higher than or lower than a specified threshold. The reporting periodicity indicates that specified data is reported based on the specified periodicity.

In addition, for technical effects of the communication method provided in the fourth aspect, refer to the technical effects of the communication method provided in the first aspect. Details are not described herein again.

According to a fifth aspect, a communication apparatus is provided. The communication apparatus includes a processing module and a transceiver module. The processing module includes a first artificial intelligence AI protocol layer and a next generation application protocol NGAP protocol layer of the communication apparatus. The first AI protocol layer of the communication apparatus is an upper layer of the NGAP protocol layer of the communication apparatus. The first AI protocol layer of the communication apparatus is configured to generate an AI parameter. The transceiver module is configured to send the AI parameter to a first access network device. The AI parameter is for indicating AI data that needs to be obtained and an obtaining manner of the AI data. The transceiver module is further configured to receive the AI data from the first access network device.

In some embodiments, the first AI protocol layer of the communication apparatus provided in the fifth aspect is further configured to: after the first AI protocol layer of the communication apparatus generates the AI parameter, encapsulate the AI parameter into a first AI protocol data unit AI PDU. In addition, the first AI protocol layer of the communication apparatus provided in the fifth aspect is further configured to send the first AI PDU to the NGAP protocol layer of the communication apparatus.

In some embodiments, the AI parameter may include a first AI parameter. The first AI parameter is sent by using an NGAP protocol layer message that is not associated with a terminal device.

Further, the first AI parameter may include a reporting content configuration. The reporting content configuration may include one or more of the following: a serving cell measurement result and/or a beam measurement result, radio link failure information, connection setup failure information, an uplink transmission delay, a downlink transmission delay, and a data transmission volume.

For example, the first AI parameter may further include a reporting occasion configuration. The reporting occasion configuration includes a reporting trigger condition and a reporting periodicity.

For example, the first AI parameter may further include a user selection configuration. The user selection configuration is for indicating a condition that needs to be met by a to-be-selected terminal device.

For example, the first AI parameter may further include an anonymization configuration. The anonymization configuration includes information indicating whether the AI data is reported anonymously, and/or an anonymization level configuration.

In some embodiments, the transceiver module is further configured to send privacy restriction information of the terminal device to the first access network device. The privacy restriction information includes one or more of the following: whether collection of data of the terminal device is allowed, whether the data of the terminal device is anonymous, anonymization level information, and whether collection of location information of the terminal device is allowed.

In some embodiments, the privacy restriction information is sent by using an initial context setup request message.

In some embodiments, the AI parameter may further include a second AI parameter. The second AI parameter is for obtaining AI data of a specific terminal device, and the second AI parameter is sent by using an NGAP protocol layer message that is associated with the terminal device.

In some embodiments, the communication apparatus provided in the fifth aspect may further include a storage module, and the storage module stores a program or instructions. When the processing module executes the program or the instructions, the communication apparatus provided in the fifth aspect is enabled to perform a function of the core network element in the communication method provided in the first aspect.

It should be noted that the communication apparatus in the fifth aspect may be a core network element, or may be a chip or a chip system disposed in the core network element. This is not limited in this application.

In addition, for technical effects of the communication apparatus provided in the fifth aspect, refer to the technical effects of the communication method provided in the first aspect. Details are not described herein again.

According to a sixth aspect, a communication apparatus is provided. The communication apparatus includes a processing module and a transceiver module. The processing module includes a first artificial intelligence AI protocol layer and a next generation application protocol NGAP protocol layer of the communication apparatus, and the first AI protocol layer of the communication apparatus is an upper layer of the next generation application protocol NGAP protocol layer of the communication apparatus. The transceiver module is configured to receive an artificial intelligence AI parameter from a core network element. The AI parameter is for indicating AI data that needs to be obtained and an obtaining manner of the AI data. The first AI protocol layer of the communication apparatus provided in the sixth aspect is configured to obtain the AI data based on the AI parameter. The transceiver module is further configured to send the AI data to the core network element.

In some embodiments, the first AI protocol layer of the communication apparatus provided in the sixth aspect is further configured to: after the first AI protocol layer of the communication apparatus obtains the AI data based on the AI parameter, encapsulate the AI data into a second AI protocol data unit AI PDU. In addition, the first AI protocol layer of the communication apparatus provided in the sixth aspect is further configured to send the second AI PDU to the NGAP protocol layer of the communication apparatus.

In some embodiments, the AI parameter includes a first AI parameter. The first AI parameter is received by using an NGAP protocol layer message that is not associated with a terminal device.

Further, the first AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume.

For example, the first AI parameter may further include a reporting occasion configuration. The reporting occasion configuration includes a reporting trigger condition and a reporting periodicity.

For example, the first AI parameter may further include a user selection configuration. The user selection configuration is for indicating a condition that needs to be met by a to-be-selected terminal device.

For example, the first AI parameter may further include an anonymization configuration. The anonymization configuration includes information indicating whether the AI data is reported anonymously, and/or an anonymization level configuration.

In some embodiments, the transceiver module is further configured to receive privacy restriction information of the terminal device from the core network element. The privacy restriction information includes one or more of the following: whether collection of data of the terminal device is allowed, whether the data of the terminal device is anonymous, anonymization level information, and whether collection of location information of the terminal device is allowed.

In some embodiments, the privacy restriction information is received by using an initial context setup request message.

In some embodiments, the transceiver module is further configured to send a handover request message to a second access network device. The handover request message carries the privacy restriction information.

In some embodiments, the AI parameter may further include a second AI parameter. The second AI parameter is for obtaining AI data of a specific terminal device, and the second AI parameter is received by using an NGAP protocol layer message that is associated with the terminal device.

In some embodiments, the communication apparatus provided in the sixth aspect includes a radio access network intelligent controller RIC and a centralized unit CU. The first AI protocol layer of the communication apparatus is located in the RIC or the CU.

It should be understood that the communication apparatus provided in the sixth aspect may alternatively use another physical architecture. For example, the communication apparatus provided in the sixth aspect includes a CU and a DU, and the AI layer of the communication apparatus provided in the sixth aspect is located in the CU; or the communication apparatus provided in the sixth aspect is not divided into a CU and a DU, in other words, both the AI layer and an original protocol layer of the communication apparatus provided in the sixth aspect are located in a same physical device. An implementation of the communication apparatus provided in the sixth aspect is not specifically limited in this embodiment of this application.

In some embodiments, the communication apparatus provided in the sixth aspect may further include a storage module, and the storage module stores a program or instructions. When the processing module executes the program or the instructions, the communication apparatus provided in the sixth aspect is enabled to perform a function of the first access network device in the communication method provided in the second aspect.

It should be noted that the communication apparatus in the sixth aspect may be a first access network device, or may be a chip or a chip system disposed in the first access network device. This is not limited in this application.

In addition, for technical effects of the communication apparatus provided in the sixth aspect, refer to the technical effects of the communication method provided in the first aspect. Details are not described herein again.

According to a seventh aspect, a communication apparatus is provided. The communication apparatus includes a processing module and a transceiver module. The processing module includes a second artificial intelligence AI protocol layer and a non-access stratum NAS protocol layer of the communication apparatus, and the second AI protocol layer of the communication apparatus is an upper layer of the non-access stratum NAS protocol layer of the communication apparatus. The second AI protocol layer of the communication apparatus is configured to generate an AI parameter. The transceiver module is configured to send the AI parameter to a terminal device. The AI parameter is for indicating AI data that needs to be obtained and an obtaining manner of the AI data. The transceiver module is further configured to receive the AI data from the terminal device.

In some embodiments, the second AI protocol layer of the communication apparatus provided in the seventh aspect is further configured to: after the second AI protocol layer of the communication apparatus generates the AI parameter, encapsulate the AI parameter into a third AI protocol data unit AI PDU. In addition, the second AI protocol layer of the communication apparatus provided in the seventh aspect is further configured to send the third AI PDU to the NAS protocol layer of the communication apparatus.

In some embodiments, the AI parameter may include a third AI parameter. The third AI parameter is for obtaining the AI data of the terminal device, and the third AI parameter is sent by using a dedicated NAS protocol layer message.

Further, the third AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume.

For example, the third AI parameter may further include a reporting occasion configuration. The reporting occasion configuration includes a reporting trigger condition and a reporting periodicity.

In some embodiments, the communication apparatus provided in the seventh aspect may further include a storage module, and the storage module stores a program or instructions. When the processing module executes the program or the instructions, the communication apparatus provided in the seventh aspect is enabled to perform a function of the core network element in the communication method provided in the third aspect.

It should be noted that the communication apparatus in the seventh aspect may be a core network element, or may be a chip or a chip system disposed in the core network element. This is not limited in this application.

In addition, for technical effects of the communication apparatus provided in the seventh aspect, refer to the technical effects of the communication method provided in the first aspect. Details are not described herein again.

According to an eighth aspect, a communication apparatus is provided. The communication apparatus includes a processing module and a transceiver module. The processing module includes a second artificial intelligence AI protocol layer and a non-access stratum NAS protocol layer of the communication apparatus, and the second AI protocol layer of the communication apparatus is an upper layer of the non-access stratum NAS protocol layer of the communication apparatus. The transceiver module is configured to receive an artificial intelligence AI parameter from a core network element. The AI parameter is for indicating AI data that needs to be obtained and an obtaining manner of the AI data. The second AI protocol layer of the communication apparatus provided in the eighth aspect is configured to obtain the AI data based on the AI parameter. The transceiver module is further configured to send the AI data to the core network element.

In some embodiments, the second AI protocol layer of the communication apparatus provided in the eighth aspect is further configured to: after the second AI protocol layer of the communication apparatus obtains the AI data based on the AI parameter, encapsulate the AI data into a fourth AI protocol data unit AI PDU. In addition, the second AI protocol layer of the communication apparatus provided in the eighth aspect is further configured to send the fourth AI PDU to the NAS protocol layer of the communication apparatus.

In some embodiments, the AI parameter may include a third AI parameter. The third AI parameter is for obtaining the AI data of the communication apparatus, and the third AI parameter is received by using a dedicated NAS protocol layer message.

Further, the third AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume.

For example, the third AI parameter includes a reporting occasion configuration. The reporting occasion configuration includes a reporting trigger condition and a reporting periodicity.

In some embodiments, the communication apparatus provided in the eighth aspect may further include a storage module, and the storage module stores a program or instructions. When the processing module executes the program or the instructions, the communication apparatus provided in the eighth aspect is enabled to perform a function of the terminal device in the communication method provided in the fourth aspect.

It should be noted that the communication apparatus in the eighth aspect may be a terminal device, or may be a chip or a chip system disposed in the terminal device. This is not limited in this application.

In addition, for technical effects of the communication apparatus provided in the eighth aspect, refer to the technical effects of the communication method provided in the first aspect. Details are not described herein again.

According to a ninth aspect, a communication apparatus is provided. The communication apparatus includes a processor. The processor is coupled to a memory. The memory is configured to store a computer program. The processor is configured to execute the computer program stored in the memory, to enable the communication apparatus to perform the communication method according to any possible implementation of the first aspect to the fourth aspect.

In some embodiments, the communication apparatus in the ninth aspect may further include a transceiver. The transceiver may be a transceiver circuit or an input/output interface. The transceiver may be used by the communication apparatus to communicate with another communication apparatus.

In this application, the communication apparatus in the ninth aspect may be a core network element, an access network device, and/or a terminal device, or a chip or a chip system disposed in the core network element, the access network device, and/or the terminal device.

For technical effects of the communication apparatus in the ninth aspect, refer to the technical effects of the communication method according to any implementation of the first aspect to the fourth aspect. Details are not described herein again.

According to a tenth aspect, a chip system is provided. The chip system includes a processor and an input/output port. The processor is configured to implement a processing function in the first aspect to the fourth aspect, and the input/output port is configured to implement a transceiver function in the first aspect to the fourth aspect.

In some embodiments, the chip system further includes a memory. The memory is configured to store program instructions and data for implementing functions in the first aspect to the fourth aspect.

The chip system may include a chip, or may include a chip and another discrete component.

According to an eleventh aspect, a communication system is provided. The communication system includes a core network element, an access network device, and a terminal device.

According to a twelfth aspect, a computer-readable storage medium is provided. The computer-readable storage medium includes a computer program or instructions. When the computer program or the instructions are run on a computer, the computer is enabled to perform the communication method according to any possible implementation of the first aspect to the fourth aspect.

According to a thirteenth aspect, a computer program product is provided. The computer program product includes a computer program or instructions. When the computer program or the instructions are run on a computer, the computer is enabled to perform the communication method according to any possible implementation of the first aspect to the fourth aspect.

DETAILED DESCRIPTION OF EMBODIMENTS

The following describes technical solutions of this application with reference to the accompanying drawings.

The technical solutions in embodiments of this application may be applied to various communication systems, for example, a wireless fidelity (Wi-Fi) system, a vehicle-to-everything (V2X) communication system, a device-to-device (D2D) communication system, an internet of vehicles communication system, a 4th generation (4G) mobile communication system such as a long term evolution (LTE) system, a 5th generation (5G) mobile communication system such as a new radio (NR) system, and a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Exactly, the term "example" is used to present a concept in a specific manner.

In embodiments of this application, terms "information (information)", "signal (signal)", "message (message)", "channel (channel)", and "signaling (signaling)" may sometimes be interchangeably used. It should be noted that meanings expressed by the terms are consistent when differences of the terms are not emphasized. Terms "of (of)", "corresponding or relevant (corresponding, relevant)", and "corresponding (corresponding)" may sometimes be interchangeably used. It should be noted that meanings expressed by the terms are consistent when differences of the terms are not emphasized.

In embodiments of this application, sometimes a subscript, for example, $W_1$, may be written in an incorrect form, for example, W1. Expressed meanings are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

Figure 1:
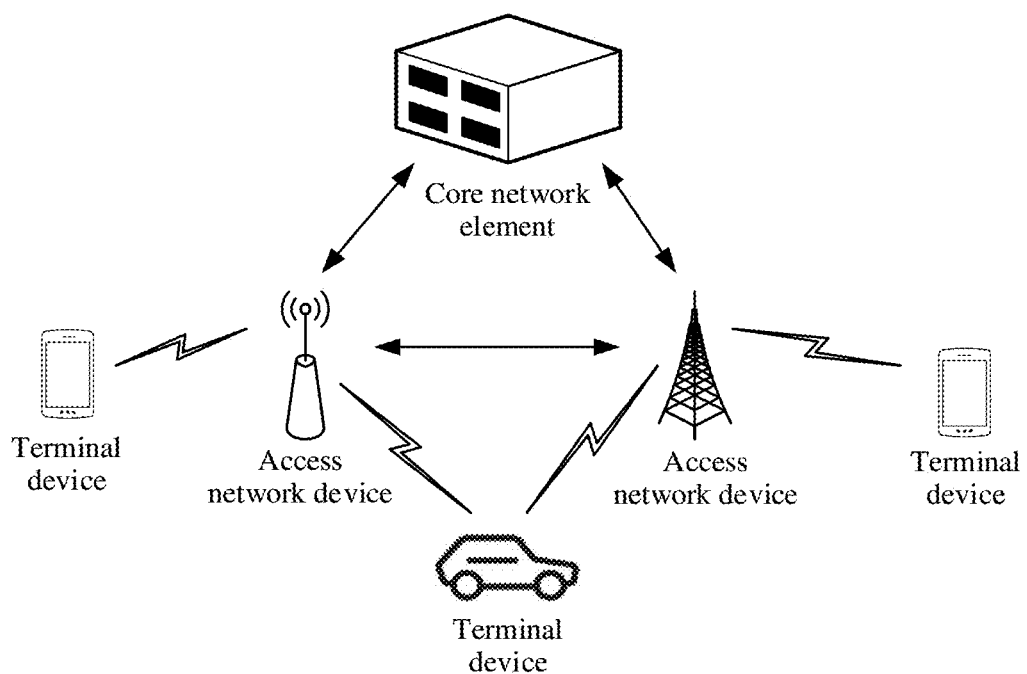
FIG. 1 is a schematic diagram of an architecture of a communication system according to an embodiment of this application.

FIG. 1 is a schematic diagram of an architecture of a communication system to which a communication method according to embodiments of this application is applicable. For ease of understanding embodiments of this application, the communication system shown in FIG. 1 is first used as an example to describe in detail a communication system to which embodiments of this application are applicable. It should be noted that the solutions in embodiments of this application may also be applied to another mobile communication system, and a corresponding name may also be replaced with a name of a corresponding function in the another mobile communication system.

As shown in FIG. 1, the communication system includes a core network including one or more core network elements, one or more access network devices, and one or more terminal devices.

The access network device is a device that is located on a network side of the communication system and that has a wireless transceiver function, or a chip or a chip system that may be disposed in the device. The access network device includes but is not limited to: an access point (AP) in a wireless fidelity (Wi-Fi) system, for example, a home gateway, a router, a server, a switch, or a bridge, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless relay node, a wireless backhaul node, a transmission point (transmission reception point, TRP; or transmission point, TP), or the like. The access network device may alternatively be a gNB or a transmission point (TRP or TP) in a 5G system, for example, a new radio (NR) system, or one antenna panel or a group of antenna panels (including a plurality of antenna panels) of a base station in a 5G system. The access network device may alternatively be a network node, for example, a baseband unit (BBU), a distributed unit (DU), or a road side unit (RSU) having a base station function, that constitutes a gNB or a transmission point.

The terminal device is a terminal that accesses the communication system and that has a wireless transceiver function, or a chip or a chip system that may be disposed in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet computer (Pad), a computer having the wireless transceiver function, a virtual reality (VR) terminal device, an augmented reality (AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a vehicle-mounted terminal, an RSU that has a terminal function, or the like. The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement the communication method provided in this application.

The core network element is a device that is located on the network side of the communication system and that provides a network service for the terminal device through the access network device, or a chip or a chip system that may be disposed in the device. The core network element may be an independent artificial intelligence function (AIF) network element, or may be a core network element with an AI function, for example, an access and mobility management function (AMF) network element.

It should be noted that the communication method provided in embodiments of this application may be used for communication between the access network device and the core network element shown in FIG. 1. In some embodiments, the communication method may be further used for communication between the terminal device and the core network element.

It should be understood that FIG. 1 is merely a simplified schematic diagram used as an example for ease of understanding. The communication system may further include another network device and/or another terminal device not shown in FIG. 1.

Figure 2:
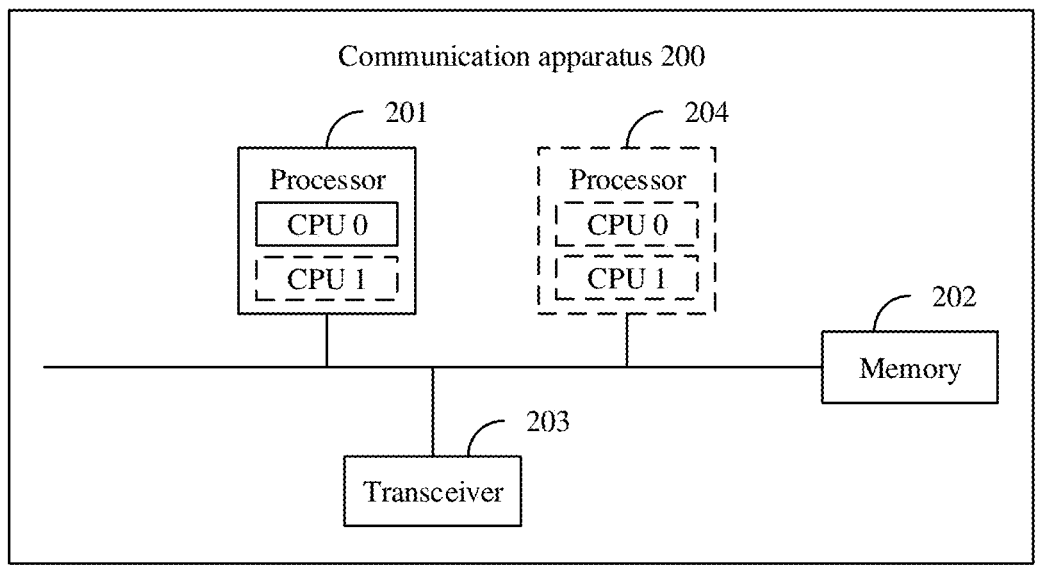
FIG. 2 is a first schematic diagram of a structure of a communication apparatus according to an embodiment of this application.

FIG. 2 is a schematic diagram of a structure of a communication apparatus that may be configured to perform a communication method according to embodiments of this application. The communication apparatus may be a core network element, or may be a chip used in the core network element or another component having a terminal function. Alternatively, the communication apparatus may be an access network device, or may be a chip used in the access network device or another component having an access network device function. Alternatively, the communication apparatus may be a terminal device, or may be a chip used in the terminal device or another component having a terminal function.

As shown in FIG. 2, the communication apparatus 200 may include a processor 201, a memory 202, and a transceiver 203. The processor 201 is coupled to the memory 202 and the transceiver 203. For example, the processor 201 may be connected to the memory 202 and the transceiver 203 through a communication bus.

The following describes each component of the communication apparatus 200 in detail with reference to FIG. 2.

The processor 201 is a control center of the communication apparatus 200, and may be one processor or may be a collective term of a plurality of processing elements. For example, the processor 201 may be one or more central processing units (CPUs), or an application-specific integrated circuit (ASIC), or may be configured as one or more integrated circuits implementing embodiments of this application, for example, one or more microprocessors (DSPs) or one or more field programmable gate arrays (FPGAs).

The processor 201 may perform various functions of the communication apparatus 200 by running or executing a software program stored in the memory 202 and invoking data stored in the memory 202.

For example, the processor 201 may be configured to implement functions of an AI protocol layer, an NGAP protocol layer, and a NAS protocol layer in the following method embodiments. For example, the processor 201 is configured to perform functions of an AI protocol layer and an NGAP protocol layer of the following core network element, or configured to perform functions of an AI protocol layer and an NGAP protocol layer of the following access network device. For another example, the processor 201 is configured to perform functions of an AI protocol layer and a NAS protocol layer of the following core network element, or configured to perform functions of an AI protocol layer and a NAS protocol layer of the following terminal device. For a specific implementation, refer to the following method embodiments. Details are not described herein.

During specific implementation, in an embodiment, the processor 201 may include one or more CPUs, for example, a CPU 0 and a CPU 1 shown in FIG. 2.

During specific implementation, in an embodiment, the communication apparatus 200 may also include a plurality of processors, for example, the processor 201 and a processor 204 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 202 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage communication device, or any other medium that can be used to carry or store expected program code in an instruction form or a data structure form and that can be accessed by a computer. However, the memory 202 is not limited thereto. The memory 202 may be integrated with the processor 201, or may exist independently, and is coupled to the processor 201 through an input/output port (not shown in FIG. 2) of the communication apparatus 200. This is not specifically limited in this embodiment of this application.

The memory 202 is configured to store a software program for performing solutions of this application, and the processor 201 controls execution of the software program. For a specific implementation, refer to the following method embodiments. Details are not described herein.

The transceiver 203 is configured to communicate with another communication apparatus. For example, the communication apparatus 200 is a core network element, and the transceiver 203 may be configured to communicate with a network device or communicate with a terminal device. For another example, the communication apparatus 200 is a network device, and the transceiver 203 may be configured to communicate with a terminal device, communicate with another network device, or communicate with a core network element. For still another example, the communication apparatus 200 is a terminal device, and the transceiver 203 may be configured to communicate with a network device, communicate with another terminal device, or communicate with a core network element. In addition, the transceiver 203 may include a receiver and a transmitter (not respectively shown in FIG. 2). The receiver is configured to implement a receiving function, and the transmitter is configured to implement a sending function. The transceiver 203 may be integrated with the processor 201, or may exist independently, and is coupled to the processor 201 through the input/output port (not shown in FIG. 2) of the communication apparatus 200. This is not specifically limited in this embodiment of this application.

It should be noted that a structure of the communication apparatus 200 shown in FIG. 2 does not constitute a limitation on the communication apparatus. An actual communication apparatus may include more or fewer components than those shown in the figure, or combine some components, or have different component arrangements.

The following describes in detail communication methods provided in embodiments of this application with reference to FIG. 3 to FIG. 17.

Figure 3:
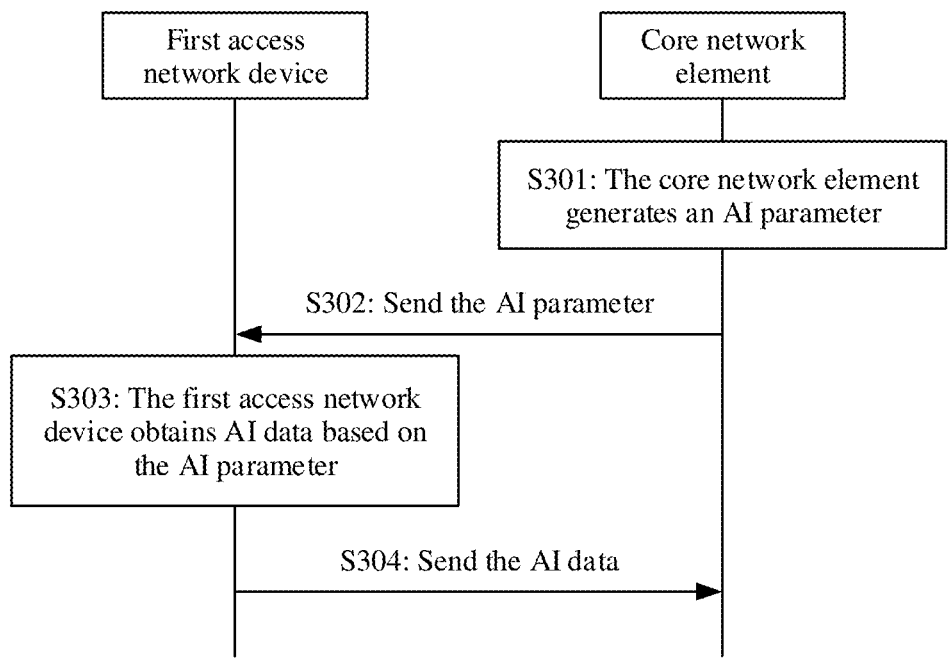
FIG. 3 is a first schematic flowchart of a communication method according to an embodiment of this application.

For example, FIG. 3 is a first schematic flowchart of a communication method according to an embodiment of this application. The communication method is applicable to communication between the core network element and the access network device in the communication system shown in FIG. 1. As shown in FIG. 3, the communication method includes the following steps.

S301: A core network element generates an AI parameter.

Figure 4:
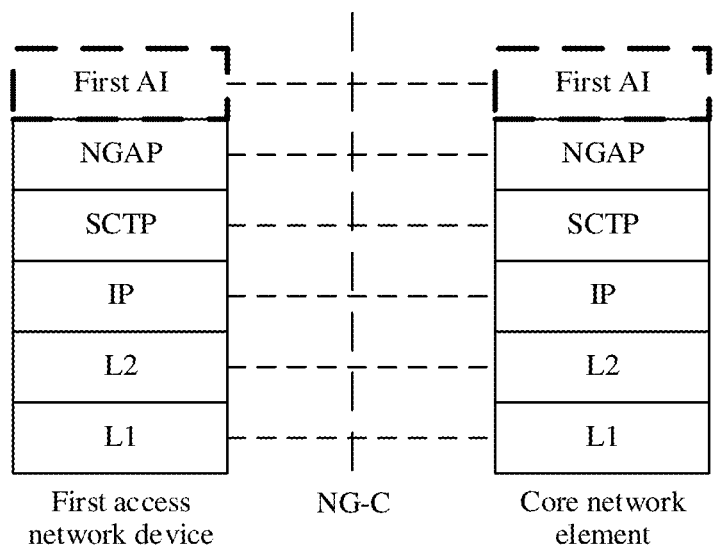
FIG. 4 is a first diagram of a protocol architecture according to an embodiment of this application.

For example, FIG. 4 is a first diagram of a protocol architecture according to an embodiment of this application. The core network element may be the core network element shown in FIG. 1, and a first access network device may be any access network device shown in FIG. 1. The core network element communicates with the first access network device through a next generation control plane (NG-C) interface. As shown in FIG. 4, from top to bottom, the core network element and the first access network device each include a first AI protocol layer, an NGAP protocol layer, a stream control transmission protocol (SCTP) layer, an internet protocol (internet protocol, IP) layer, a layer 2 (layer 2, L2), and a physical layer (physical layer, PHY, which is also referred to as a layer 1, namely, layer 1, L1). In other words, a first AI protocol layer of the core network element is an upper layer of an NGAP protocol layer of the core network element. Correspondingly, a first AI protocol layer of the first access network device is an upper layer of an NGAP protocol layer of the first access network device. The first AI protocol layer is an optional protocol layer (represented by a dashed-line box in FIG. 4).

Protocol layers that are of the core network element and the first access network device and that have a same name may be referred to as peer protocol layers. For example, the first AI protocol layer of the core network element and the first AI protocol layer of the first access network device are a pair of peer protocol layers, and the NGAP protocol layer of the core network element and the NGAP protocol layer of the first access network device are a pair of peer protocol layers. A peer protocol layer of a sender is configured to generate and send data, and a peer protocol layer of a receiver is configured to receive and parse the data sent by the sender.

In some embodiments, that a core network element generates an AI parameter in S301 may include: The first AI protocol layer of the core network element generates the AI parameter.

Specifically, the first AI protocol layer is an independent protocol layer introduced in this embodiment of this application. The first AI protocol layer is the upper layer of the NGAP protocol layer, and is configured to perform an AI function-related operation. In other words, in this embodiment of this application, optimization of the core network element may be completed through an independent protocol layer procedure, to separate an AI function from a communication function, so that the AI parameter can be flexibly adjusted to meet various types of AI requirements, and the communication function is not negatively affected.

The first AI protocol layer may be configured to generate the AI parameter based on a specific AI requirement.

In some embodiments, that a core network element generates an AI parameter in S301 may further include: The NGAP protocol layer of the core network element generates the AI parameter.

Specifically, the NGAP protocol layer is an NGAP protocol layer having an AI function. The NGAP protocol layer may be used to perform an AI function-related operation, to generate the AI parameter. In other words, in this embodiment of this application, optimization of the core network element may be completed through an NGAP protocol layer procedure with the AI function.

The AI parameter is for indicating AI data that needs to be obtained and an obtaining manner of the AI data, and may include one or more of the following: the obtaining manner (a collection manner and/or a training manner) of the AI data, an AI algorithm model and a training parameter of the AI algorithm model, an AI data reporting occasion (periodic reporting, reporting triggered by a network event, or reporting performed when a reporting request is received), a type (a training result and/or a collected training sample) and a volume of the AI data, identification information of a terminal device that performs a training or data collection task, and the like.

The AI data is data obtained by the first access network device based on the AI parameter, and includes but is not limited to data obtained based on the AI parameter, for example, data that can be used to implement network optimization or improve communication performance of the terminal device such as gradient data, various measurement reports, and various communication records.

The AI data is classified into management-based AI data and AI data of a specific terminal device.

The management-based AI data may include statistics data of a plurality of terminal devices. For example, an average delay of data transmission of a system is collected. The core network element performs artificial intelligence analysis on the obtained management-based AI data, and performs network optimization based on an analysis result, to improve network performance of the core network element.

The AI data of the specific terminal device includes data of a particular terminal device. For example, a data transmission feature and a data quality of service satisfaction status of the particular terminal device are included. After performing artificial intelligence analysis on the AI data of the specific terminal device, the core network element configures a more appropriate parameter for the terminal device, to improve communication performance of the terminal device, and therefore improve user experience.

In some embodiments, the AI parameter may include a first AI parameter, and the first AI parameter is sent by the core network element by using an NGAP protocol layer message that is not associated with a terminal device. Correspondingly, the first AI parameter is also received by the first access network device by using the NGAP protocol layer message that is not associated with the terminal device.

The NGAP protocol layer message that is not associated with the terminal device does not specify obtaining of AI data of a specific terminal device. In other words, the first AI parameter is for obtaining the management-based AI data, and a terminal device that reports the AI data is not limited. The first access network device may choose to collect AI data of a plurality of terminal devices based on the first AI parameter and perform statistics collection, and then send a statistical result to the core network element, so that core network element performs artificial intelligence analysis on the management-based AI data. This can not only resolve a problem that the core network element cannot obtain management-based AI data, but also implement self-optimization of the core network element and improve an intelligence level of the core network element, so that the network performance and running efficiency of the core network element are improved.

For specific implementations of sending and receiving the first AI parameter, refer to related content in S302. Details are not described herein.

In some embodiments, the first AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume. The reporting content configuration may further include whether to report location information. The reporting content configuration may be for indicating specific AI data to be reported by the first access network device to the core network element, so that the core network element completes network optimization based on the AI data.

In some embodiments, the first AI parameter may further include a reporting occasion configuration. The reporting occasion configuration includes a reporting trigger condition, a reporting periodicity, and the like. The reporting trigger condition means that reporting is performed after the specified condition is met. For example, the reporting trigger condition may include: load of a cell is higher than a specified threshold, a quantity of users that are in a connected state in the cell is higher than or lower than a specified threshold, or a specified time point. The reporting periodicity indicates that specified data is reported based on the specified periodicity.

In some embodiments, the first AI parameter may further include a user selection configuration. The user selection configuration is for indicating a condition that needs to be met by a to-be-selected terminal device. For example, the user selection configuration may include: selecting a terminal device in a specified cell list range, selecting a terminal device of a specified type, or selecting a terminal device whose serving cell signal quality is higher than or lower than a specific threshold. The user selection configuration may also indicate a quantity of to-be-selected terminal devices or a proportion of to-be-selected terminal devices. In other words, the user selection configuration may be for indicating the first access network device to select, based on the user selection configuration, a terminal device that meets the condition, collect or obtain AI data, and then report the AI data to the core network element, so that the core network element completes network optimization based on the AI data.

In some embodiments, the first AI parameter may further include an anonymization configuration. The anonymization configuration includes information indicating whether the AI data is reported anonymously, and/or an anonymization level configuration. In some embodiments, if the AI data is anonymously reported, the anonymization level configuration may include no user ID or include an anonymized ID, for example, a mobile station identification code software version (international mobile equipment identity software version, IMEI-SV). In this way, the core network element may indicate the first access network device whether to anonymously report the AI data of the terminal device, to protect user privacy.

Further, the AI parameter may further include a second AI parameter. The second AI parameter is for obtaining the AI data of the specific terminal device, and the second AI parameter is sent by using an NGAP protocol layer message that is associated with the terminal device. The second AI parameter limits the terminal device that reports the AI data, for example, limits a type, a service type, a location, and received signal quality and/or strength of the terminal device. In this way, the first access network device forwards the second AI parameter to the specific terminal device, obtains the AI data of the specific terminal device, and then forwards the AI data of the specific terminal device to the core network element. After performing artificial intelligence analysis on the AI data, the core network element may configure the more appropriate parameter for the terminal device, so that the communication performance of the specific terminal device can be improved.

For specific implementations of sending and receiving the second AI parameter, refer to related content in S302. Details are not described herein.

S302: The core network element sends the AI parameter to the first access network device. Correspondingly, the first access network device receives the AI parameter from the core network element.

In some embodiments, that the core network element sends the AI parameter to the first access network device in S302 may include: The first AI protocol layer of the core network element sends the AI parameter to a physical layer of the core network element layer by layer in order of protocol layers from top to bottom, and the physical layer of the core network element sends the AI parameter by using a resource on the NG-C interface.

Specifically, with reference to FIG. 4, the first AI protocol layer of the core network element may encapsulate the AI parameter generated by the first AI protocol layer in S301, for example, the first AI parameter or the second AI parameter, into a data packet, and send the data packet to the physical layer of the core network element layer by layer in order of the protocol layers from top to bottom, and the physical layer of the core network element sends the data packet by using the resource on the NG-C interface. The following provides detailed descriptions with reference to FIG. 4.

That the core network element sends the AI parameter to the first access network device in S302 may include the following step 1 to step 3.

Step 1: The first AI protocol layer of the core network element encapsulates the AI parameter into a first AI protocol data unit (PDU). The AI parameter includes the first AI parameter, or includes the second AI parameter.

Figure 5:
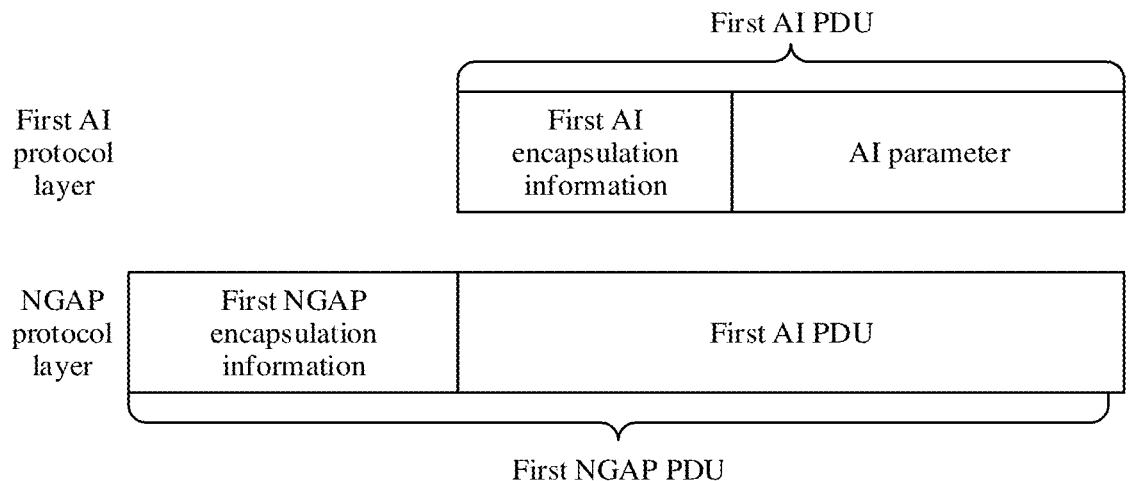
FIG. 5 is a first schematic diagram of a structure of a PDU according to an embodiment of this application.

For example, FIG. 5 is a first schematic diagram of a structure of a PDU according to an embodiment of this application. With reference to FIG. 4, as shown in FIG. 5, the first AI protocol layer of the core network element may add first AI encapsulation information to the AI parameter, to generate the first AI PDU.

It should be noted that when there are a plurality of AI parameters, fields in the first AI PDU that are specifically occupied by different AI parameters are not specifically limited in this embodiment of this application.

Step 2: The first AI protocol layer of the core network element sends the first AI PDU to the NGAP protocol layer of the core network element. Correspondingly, the NGAP protocol layer of the core network element receives the first AI PDU from the first AI protocol layer of the core network element.

For example, the first AI protocol layer of the core network element may send the first AI PDU to the NGAP protocol layer of the core network element through an interface between the first AI protocol layer of the core network element and the NGAP protocol layer of the core network element.

Step 3: The NGAP protocol layer of the core network element encapsulates the first AI PDU into a first NGAP PDU, and sends the first NGAP PDU.

With reference to FIG. 4, as shown in FIG. 5, the NGAP protocol layer of the core network element adds first NGAP encapsulation information to the first AI PDU, to generate the first NGAP PDU, and then sends the first NGAP PDU by using an NGAP message.

For example, a first NGAP PDU including the first AI parameter may be sent by using the NGAP protocol layer message that is not associated with the terminal device. The NGAP protocol layer message that is not associated with the terminal device is an NGAP protocol layer message that is introduced in this embodiment of this application and that is specially used for sending the first AI parameter, and is distinguished from an NGAP protocol layer message related to a sending communication function, so that the AI function is further separated from the communication function.

For example, a first NGAP PDU including the second AI parameter may be sent by using the NGAP protocol layer message that is associated with the terminal device. The NGAP protocol layer message that is associated with the terminal device is an NGAP protocol layer message that is introduced in this embodiment of this application and that is specially used for sending the second AI parameter, and is distinguished from an NGAP protocol layer message related to a sending communication function, so that the AI function is further separated from the communication function.

It can be learned from step 1 to step 3 that, in this embodiment of this application, the first AI protocol layer of the core network element can be separated from an existing protocol layer of the core network element, and the AI function can be further separated from the communication function, so that flexibility of the AI function supported by the core network element can be improved. In addition, the existing protocol layer does not need to perform an AI-related operation, so that impact of the AI function on the communication function can be reduced, and technical complexity of the core network element can be reduced, to reduce development costs and deployment costs of the core network element.

In correspondence to step 1 to step 3 in which the core network element sends the AI parameter at the protocol layers shown in FIG. 4 from top to bottom, the first access network device may receive and parse the AI parameter at protocol layers shown in FIG. 4 from bottom to top. Specifically, that the first access network device receives the AI parameter from the core network element in S302 may include the following step 4 to step 6.

Step 4: The NGAP protocol layer of the first access network device receives the first NGAP PDU, and parses the first NGAP encapsulation information to obtain the first AI PDU.

For a specific implementation, refer to the foregoing step 3. Details are not described herein again.

Step 5: The NGAP protocol layer of the first access network device sends the first AI PDU to the first AI protocol layer of the first access network device. Correspondingly, the first AI protocol layer of the first access network device receives the first AI PDU from the NGAP protocol layer of the first access network device.

For a specific implementation, refer to the foregoing step 2. Details are not described herein again.

Step 6: The first AI protocol layer of the first access network device parses the first AI PDU to obtain the AI parameter.

For a specific implementation, refer to the foregoing step 1. Details are not described herein again.

In some embodiments, that the core network element sends the AI parameter to the first access network device in S302 may include: The NGAP protocol layer that is of the core network element and that has the AI function sends the AI parameter to a physical layer of the core network element layer by layer in order of protocol layers from top to bottom, and the physical layer of the core network element sends the AI parameter by using a resource on the NG-C interface. The AI parameter includes the first AI parameter, or includes the second AI parameter.

In some embodiments, the first AI parameter may be sent by using the NGAP protocol layer message that is not associated with the terminal device. The NGAP protocol layer message that is not associated with the terminal device is an NGAP protocol layer message that is introduced in this embodiment of this application and that is specially used for sending the first AI parameter, and is distinguished from an NGAP protocol layer message related to a sending communication function, so that the AI function is separated from the communication function.

In some embodiments, the second AI parameter may be sent by using the NGAP protocol layer message that is associated with the terminal device. The NGAP protocol layer message that is associated with the terminal device is an NGAP protocol layer message that is introduced in this embodiment of this application and that is specially used for sending the second AI parameter, and is distinguished from an NGAP protocol layer message related to a sending communication function, so that the AI function is separated from the communication function.

Correspondingly, that the first access network device receives the AI parameter from the core network element in S302 may further include: The first access network device may receive, parse, and obtain the AI parameter at protocol layers shown in FIG. 4 from bottom to top, that is, a physical layer to the NGAP layer sequentially receive and parse the AI parameter, and the NGAP protocol layer obtains the AI parameter.

In some embodiments, the first AI parameter may be received by using the NGAP protocol layer message that is not associated with the terminal device. The NGAP protocol layer message that is not associated with the terminal device is an NGAP protocol layer message that is introduced in this embodiment of this application and that is specially used for receiving the first AI parameter, and is distinguished from an NGAP protocol layer message related to a receiving communication function, so that an AI function is separated from a communication function.

In some embodiments, the second AI parameter may be received by using the NGAP protocol layer message that is associated with the terminal device. The NGAP protocol layer message that is associated with the terminal device is an NGAP protocol layer message that is introduced in this embodiment of this application and that is specially used for receiving the second AI parameter, and is distinguished from an NGAP protocol layer message related to a receiving communication function, so that an AI function is separated from a communication function.

In some embodiments, the core network element may send privacy restriction information of the terminal device to the first access network device. Correspondingly, the first access network device may receive the privacy restriction information of the terminal device from the core network element.

The privacy restriction information may include one or more of the following: whether collection of data of the terminal device is allowed, whether the data of the terminal device needs to be anonymized, anonymization level information, and whether collection of location information of the terminal device is allowed. The privacy restriction information is a privacy requirement of the terminal device, and the first access network device may select a terminal device based on the privacy restriction information of the terminal device. The anonymization level information may include no user ID or may include an anonymized ID, for example, a mobile station identification code software version (IMEI-SV).

In some embodiments, the core network element may send the privacy restriction information of the terminal device together with the AI parameter to the first access network device. Correspondingly, the first access network device may receive the privacy restriction information of the terminal device and the AI parameter from the core network element. In this way, a process in which the first access network device obtains the privacy restriction information from the terminal device can be reduced, so that a quantity of signaling interaction times is reduced, and signaling resources are reduced. Therefore, AI training efficiency is further improved.

In some embodiments, the core network element may further separately send the privacy restriction information of the terminal device to the first access network device. In this way, the privacy restriction information of the terminal device may be used to implement the AI function or another function, for example, a measurement function.

For example, the privacy restriction information is sent by the core network element by using an initial context setup request message. Correspondingly, the privacy restriction information is received by the first access network device by using the initial context setup request message.

Figure 6:
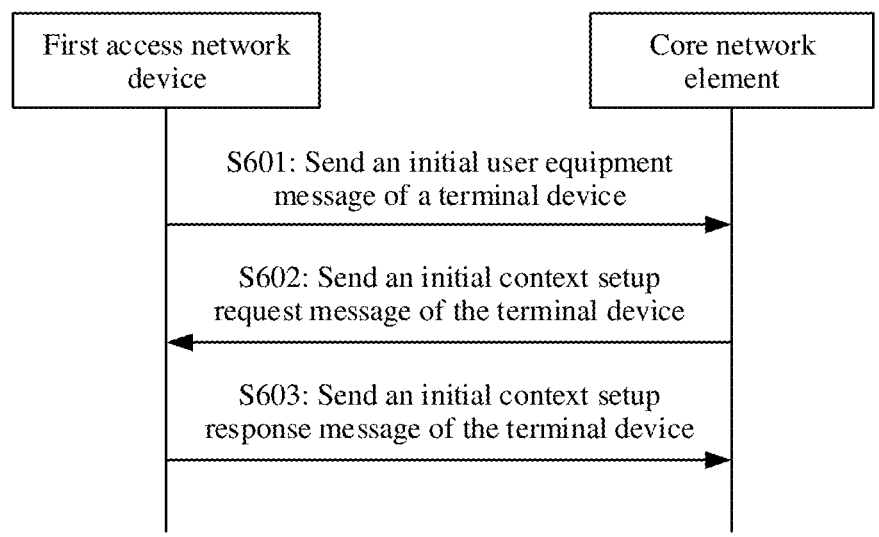
FIG. 6 is a second schematic flowchart of a communication method according to an embodiment of this application.

Specifically, FIG. 6 is a second schematic flowchart of a communication method according to an embodiment of this application. That a core network element sends privacy restriction information by using an initial context setup request message, and a first access network device receives the privacy restriction information by using the initial context setup request message may include the following S601 to S603.

S601: The first access network device sends an initial user equipment message (initial UE message) of a terminal device to the core network element. Correspondingly, the core network element receives the initial user equipment message of the terminal device from the first access network device. The initial user equipment message of the terminal device is for transmitting an initial layer 3 message to the core network element.

S602: The core network element sends the initial context setup request message (initial UE context setup request) of the terminal device to the first access network device. Correspondingly, the first access network device receives the initial context setup request message of the terminal device from the core network element. The initial context setup request message of the terminal device is for requesting the first access network device to set up a context of the terminal device, and the initial context setup request message of the terminal device carries the privacy restriction information of the terminal device.

S603: The first access network device sends an initial context setup response message (initial UE context setup response) of the terminal device to the core network element. Correspondingly, the core network element receives the initial context setup response message of the terminal device from the first access network device. The initial context setup response message is for confirming, to the core network element, that context setup succeeds.

In this way, the first access network device may subsequently select a terminal device based on the privacy restriction information of the terminal device. For example, after receiving a user selection configuration and an anonymization configuration, the first access network device may select the terminal device based on the user selection configuration, the anonymization configuration, and the privacy restriction information.

The privacy restriction information may be determined by the core network element, or may be from a privacy protection instruction set by a user through the terminal device. An execution body that determines the privacy restriction information is not limited in this embodiment of this application. The method shown in FIG. 6 may be an independent embodiment, or may be combined with another embodiment.

It should be noted that step 4 to step 6 are described by using a protocol architecture of the first access network device shown in FIG. 4 as an example. During actual application, based on different physical architectures, protocol layers of the first access network device may be located in different physical entities. The following further describes specific implementations of step 4 to step 6 with reference to several physical architectures of the first access network device.

For example, FIG. 7 to FIG. 10 respectively show physical architectures 1 to 4 of a first access network device according to an embodiment of this application. The first access network device may be implemented by using any one of the physical architectures shown in FIG. 7 to FIG. 10, provided that the first AI protocol layer of the first access network device is located above the NGAP protocol layer of the first access network device. The following provides descriptions with reference to FIG. 4 and FIG. 5.

Figure 7:
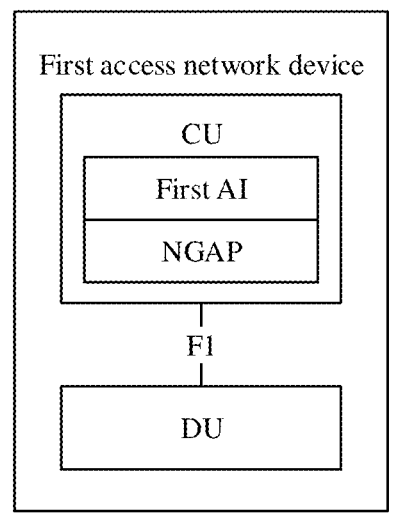
FIG. 7 is a first diagram of an architecture of an access network device according to an embodiment of this application.

As shown in FIG. 7, the first access network device may include a CU and a DU. The first AI protocol layer and the NGAP protocol layer of the first access network device are located in the CU, and the CU communicates with the DU through an F1 interface.

With reference to FIG. 4 and FIG. 5, as shown in FIG. 7, the CU may receive the first NGAP PDU from the DU through the F1 interface, and the foregoing step 4 to step 6 may be considered as internal operations of the CU.

Figure 8:
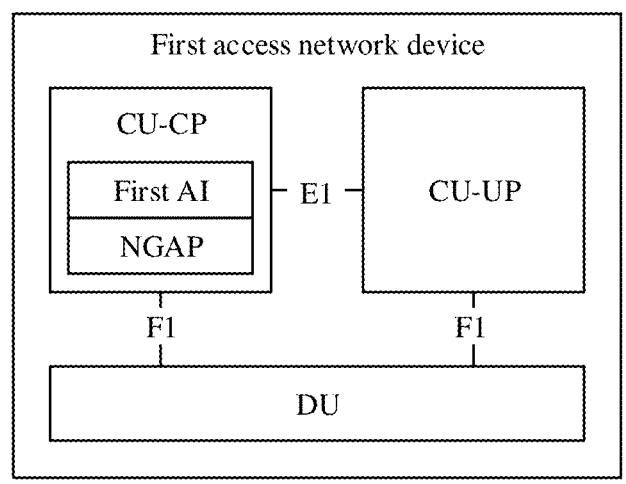
FIG. 8 is a second diagram of an architecture of an access network device according to an embodiment of this application.

In some embodiments, as shown in FIG. 8, the CU of the first access network device may be further divided into two parts: a control plane (CU-control plane, CU-CP) and a user plane (CU-user plane, CU-UP). The first AI protocol layer and the NGAP protocol layer of the first access network device are located in the CU-CP. The CU-CP communicates with the CU-UP through an E1 interface, and the CU-CP and the CU-UP each communicate with the DU through an F1 interface. With reference to FIG. 4 and FIG. 5, as shown in FIG. 8, the foregoing step 4 to step 6 may be considered as internal operations of the CU-CP. Then, the CU-CP may receive the data packet including the AI parameter from the DU through the F1 interface, and parse the data packet to obtain the AI parameter.

Figure 9:
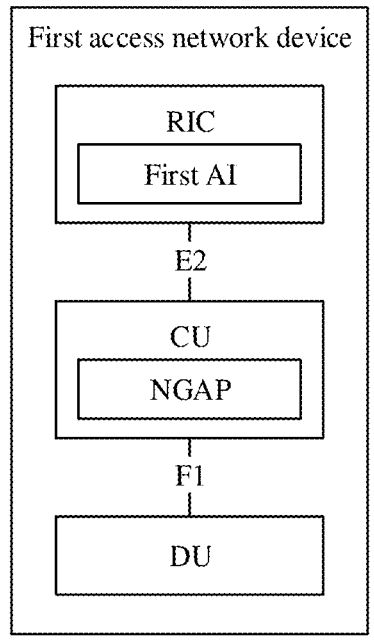
FIG. 9 is a third diagram of an architecture of an access network device according to an embodiment of this application.

Further, as shown in FIG. 9, for the first access network device that uses an open radio access network (O-RAN) architecture, the first AI protocol layer of the first access network device may be physically separated from a protocol layer that implements the communication function. Specifically, with reference to FIG. 4 and FIG. 5, as shown in FIG. 9, the first access network device includes a RAN intelligent controller (RIC), a CU, and a DU. The RIC communicates with the CU through an E2 interface, and the CU communicates with the DU through an F1 interface. The first AI protocol layer of the first access network device is located in the RIC, and the NGAP protocol layer of the first access network device is located in the CU. With reference to FIG. 4 and FIG. 5, as shown in FIG. 9, the CU receives the first NGAP PDU from the DU through the F1 interface, and parses the first NGAP encapsulation information to obtain the first AI PDU, that is, performs the foregoing step 4. Then, the CU may perform the foregoing step 5, to be specific, send the first AI PDU to the RIC through the E2 interface. Then, the RIC performs the foregoing step 6, to be specific, parses the first AI PDU, and obtains the AI parameter.

In this way, the RIC is used for AI function-related communication between the first access network device and the core network element, and the CU is used for non-AI function communication between the first access network device and the core network element and between the first access network device and the terminal device, so that the AI function can be further separated from the communication function, and technical complexity of the first access network device can be reduced, to reduce development costs and deployment costs of the first access network device.

Figure 10:
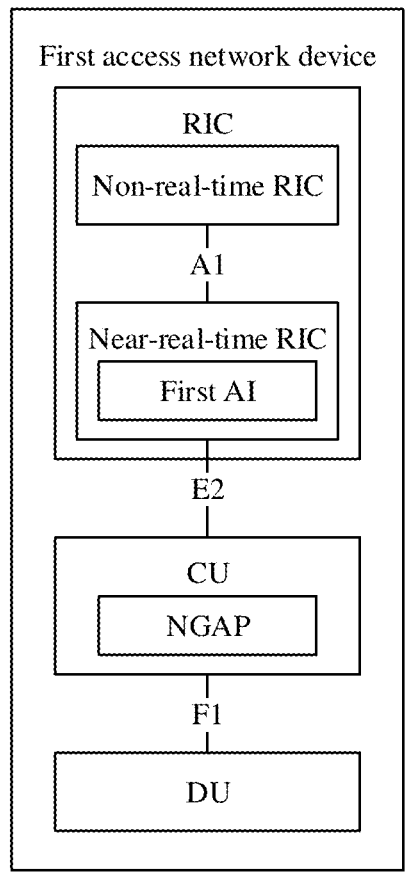
FIG. 10 is a fourth diagram of an architecture of an access network device according to an embodiment of this application.

Further, with reference to FIG. 9, as shown in FIG. 10, the RIC of the first access network device may be further divided into a non-real-time (non-real-time) RIC and a near-real-time (near-real-time) RIC, and the non-real-time RIC communicates with the near-real-time RIC through an AI interface. The near-real-time RIC includes functions such as an artificial intelligence training model, radio connection management, mobility management, quality of service (QoS) management, and interference management. That is, the first AI protocol layer of the first access network device is located in the near-real-time RIC, and the NGAP protocol layer of the first access network device is located in the CU. For a function and an implementation of the non-real-time RIC, refer to a current technology. Details are not described in this embodiment of this application.

With reference to FIG. 4 and FIG. 5, as shown in FIG. 10, the CU receives the first NGAP PDU from the DU through the F1 interface, and parses the first NGAP encapsulation information to obtain the first AI PDU, that is, performs the foregoing step 4. Then, the CU may perform the foregoing step 5, to be specific, send the first AI PDU to the near-real-time RIC through the E2 interface. Then, the near-real-time RIC performs the foregoing step 6, to be specific, parses the first AI PDU, and obtains the AI parameter.

Figure 11:
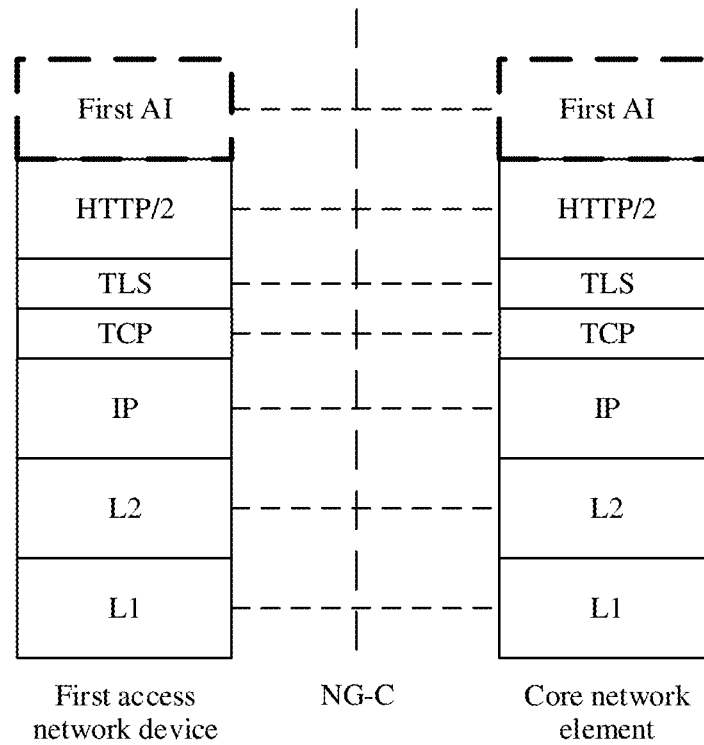
FIG. 11 is a second diagram of a protocol architecture according to an embodiment of this application.

In some embodiments, when the first access network device uses the physical architecture shown in FIG. 9 or FIG. 10, a protocol architecture shown in FIG. 11 may be further used between the first access network device and the core network device. The core network element may be the core network element shown in FIG. 1. The first access network device may be the first access network device that uses the O-RAN architecture and that is shown in FIG. 9, or may be the first access network device shown in FIG. 10 in which the RIC is divided into the non-real-time RIC and the near-real-time RIC. The core network element communicates with the first access network device through a next generation control plane (NG-C) interface.

As shown in FIG. 11, from top to bottom, the core network element and the first access network device each include a first AI protocol layer, a hypertext transfer protocol 2 (HTTP/2) layer, a telephone control protocol (TLS) layer, a transmission control protocol (TCP) layer, an internet protocol (IP) layer, an L2 protocol layer, and a physical layer (physical layer, PHY, which is also referred to as a layer 1, namely, layer 1, L1). In other words, a first AI protocol layer of the core network element is an upper layer of an HTTP/2 protocol layer of the core network element. Correspondingly, a first AI protocol layer of the first access network device is an upper layer of an HTTP/2 protocol layer of the first access network device.

Similar to the protocol architecture shown in FIG. 4, the first AI protocol layer in FIG. 11 is an independent protocol layer introduced in this embodiment of this application, to separate the AI function from the communication function, so that the AI parameter can be flexibly adjusted to meet various types of AI requirements, and the communication function is not negatively affected.

It should be noted that the first AI protocol layer shown in FIG. 11 may perform related operations performed by the first AI protocol layer shown in FIG. 4, and the HTTP/2 protocol layer shown in FIG. 11 may perform related operations performed by the NGAP protocol layer shown in FIG. 4, for example, generate the AI parameter. For technical effects of performing the communication method provided in embodiments of this application by the first access network device and the core network element using the protocol architecture shown in FIG. 11, refer to the technical effects of performing the communication method provided in embodiments of this application by the first access network device and the core network element using the protocol architecture shown in FIG. 4. Details are not described herein again.

It should be noted that the first access network device may alternatively use another physical architecture. For example, the first access network device is not divided into a CU and a DU internally. In other words, both the first AI protocol layer and an original communication protocol layer of the first access network device are located in a same physical device. For another example, there may be one or more CUs and DUs in the first access network device. For still another example, protocol layers included in the CU and the DU in the first access network device may also have a plurality of division manners. Further, the CU and the DU may be internally divided into different entities based on the protocol layers. A specific implementation of the first access network device is not limited in this embodiment of this application.

S303: The first access network device obtains the AI data based on the AI parameter.

In some embodiments, that the first access network device obtains the AI data based on the AI parameter in S303 may include: The first AI protocol layer of the first access network device obtains the AI data based on the AI parameter.

In some embodiments, that the first access network device obtains the AI data based on the AI parameter in S303 may include: The NGAP protocol layer of the first access network device obtains the AI data based on the AI parameter.

For example, the first access network device may select a terminal device that meets a condition based on the user selection configuration, the anonymization configuration, and the like that are included in the first AI parameter, or the second AI parameter, and/or the privacy restriction information and the like, perform data collection or statistics collection on the selected terminal device based on the reporting content configuration and the reporting occasion configuration, perform a training task and/or a collection task, and report a training result and/or collected data to the core network element. For content of the AI data and a specific implementation of the obtaining manner of the AI data, refer to related content in S301. Details are not described herein again.

S304: The first access network device sends the AI data to the core network element. Correspondingly, the core network element receives the AI data from the first access network device.

In some embodiments, that the first access network device sends the AI data to the core network element in S304 may include the following step 7 to step 9.

Step 7: The first AI protocol layer of the first access network device encapsulates the AI data into a second AI PDU.

Figure 12:
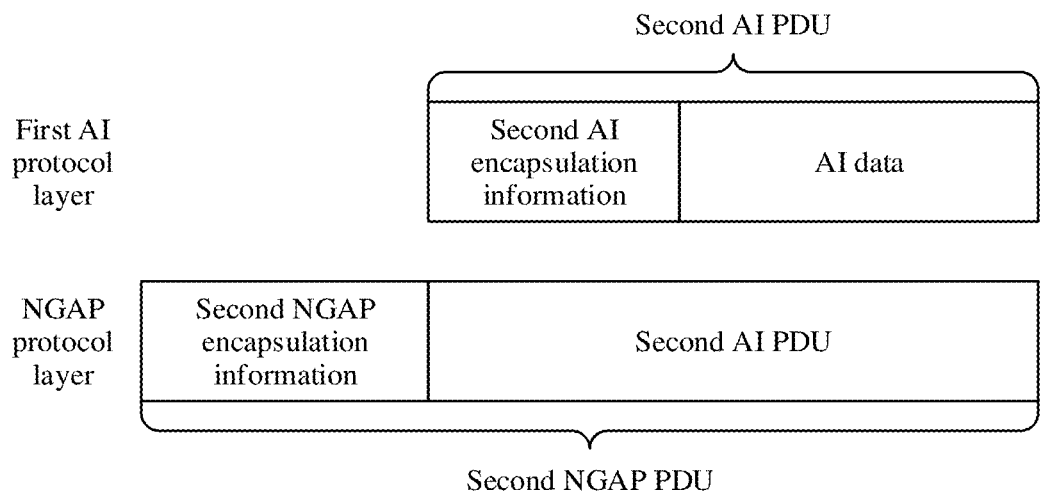
FIG. 12 is a second schematic diagram of a structure of a PDU according to an embodiment of this application.

For example, FIG. 12 is a second schematic diagram of a structure of a PDU according to an embodiment of this application. With reference to FIG. 4, as shown in FIG. 12, the first AI protocol layer of the first access network device may add second AI encapsulation information to the AI data, to generate the second AI PDU.

Step 8: The first AI protocol layer of the first access network device sends the second AI PDU to the NGAP protocol layer of the first access network device. Correspondingly, the NGAP protocol layer of the first access network device receives the second AI PDU from the first AI protocol layer of the first access network device.

For example, the first AI protocol layer of the first access network device may send the second AI PDU to the NGAP protocol layer of the first access network device through an interface between the first AI protocol layer of the first access network device and the NGAP protocol layer of the first access network device.

Step 9: The NGAP protocol layer of the first access network device adds second NGAP encapsulation information to the second AI PDU and sends the second AI PDU.

Specifically, with reference to FIG. 4, as shown in FIG. 12, the NGAP protocol layer of the first access network device may add the second NGAP encapsulation information to the second AI PDU, to generate a second NGAP PDU, and then send the second NGAP PDU by using an NGAP message.

It can be learned from step 7 to step 9 that, in this embodiment of this application, the AI protocol layer of the first access network device can be separated from an existing protocol layer of the first access network device, and the AI function can be further separated from the communication function, so that flexibility of the AI function supported by the first access network device can be improved. In addition, the existing protocol layer does not need to perform an AI-related operation, so that impact of the AI function on the communication function can be reduced, and the technical complexity of the first access network device can be reduced, to reduce costs of the first access network device.

In some embodiments, that the first access network device sends the AI data to the core network element in S304 may further include: The NGAP protocol layer of the first access network device sends the AI data to the physical layer of the first access network device layer by layer in order of the protocol layers from top to bottom, and the physical layer of the first access network device sends the AI data by using a resource on the NG-C interface. The AI parameter includes the first AI parameter, or includes the second AI parameter.

In some embodiments, the first AI protocol layer of the first access network device may alternatively be an upper layer of an RRC protocol layer of the first access network device. Correspondingly, the first AI protocol layer is further used for AI function interaction between the first access network device and the terminal device.

Figure 13:
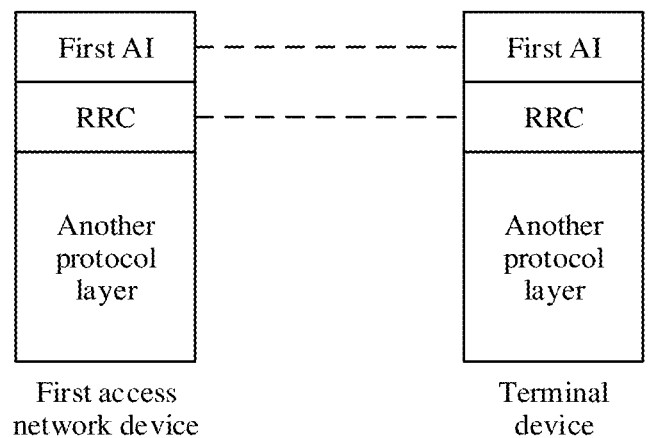
FIG. 13 is a third diagram of a protocol architecture according to an embodiment of this application.

For example, FIG. 13 is a third diagram of a protocol architecture according to an embodiment of this application. The first access network device may be any access network device shown in FIG. 1, and the terminal device may be any terminal device shown in FIG. 1. RRC protocol layer interaction and/or AI protocol layer interaction exist/exists between the first access network device and the terminal device. As shown in FIG. 13, from top to bottom, the first access network device and the terminal device each include an AI protocol layer, an RRC protocol layer, and another protocol layer. In other words, an AI protocol layer of the first access network device is an upper layer of an RRC protocol layer of the first access network device. Correspondingly, an AI protocol layer of the terminal device is an upper layer of an RRC protocol layer of the terminal device. For the another protocol layer other than the AI protocol layer and the RRC protocol layer, refer to an existing implementation. Details are not described in this embodiment of this application.

In some embodiments, for the first access network device, an AI protocol layer configured to interact with the core network element and an AI protocol layer configured to interact with the first access network device may be a same AI protocol layer. In other words, the AI protocol layer is not only an upper layer of the NGAP protocol layer, but also an upper layer of the RRC protocol layer. An AI PDU of the AI protocol layer may be directly sent to the NGAP protocol layer to interact with the core network element, and may be directly sent to the RRC protocol layer to interact with the terminal device. In other words, for the first access network device, an AI function corresponding to the core network element and an AI function corresponding to the terminal device are implemented at a same AI protocol layer.

In some embodiments, the first access network device may alternatively have two AI protocol layers. One AI protocol layer may send an AI PDU to the NGAP protocol layer, to interact with the core network element. The other AI protocol layer may send the AI PDU to the RRC protocol layer, to interact with the terminal device.

If the terminal device needs to be handed over from the first access network device to a second access network device, the communication method shown in FIG. 6 may further include: The first access network device sends a handover request message to the second access network device. Correspondingly, the second access network device receives the handover request message from the first access network device.

The handover request message may carry the privacy restriction information. For a specific implementation of the privacy restriction information, refer to S602. In this way, the second access network device does not need to obtain the privacy restriction information from the core network element, so that a quantity of signaling interaction times can be reduced, and signaling resources can be reduced. Therefore, AI training efficiency is further improved.

Based on the communication method shown in FIG. 3, an independent AI protocol layer is introduced above the NGAP protocol layer of the core network element, so that a type of the AI function and a quantity of AI functions supported by the core network element can be flexibly adjusted based on an actual AI training requirement. For example, a new AI function is introduced, or an original AI function is modified, deleted, or recombined. In addition, the communication function of the core network element can be separated from the AI function of the core network element. For example, AI functions such as generating the AI parameter, receiving and parsing the AI data reported by the first access network device, and completing a network optimization operation based on the AI data are completed by the AI protocol layer of the core network element. However, an original protocol layer of the core network element, for example, the NGAP protocol layer, only needs to implement the communication function, and does not need to perform an AI function-related operation. In this way, a problem that the AI function is bound to an existing NGAP protocol layer procedure such as minimization of drive tests because the AI function is completed through the existing NGAP protocol layer procedure can be resolved. Therefore, diversity and flexibility of the AI function supported by the core network element are improved, and network performance of the core network element is improved. In addition, the original protocol layer does not need to be modified, and a technical difficulty in implementing the AI function is low, so that an existing protocol is not affected, and device development costs and network deployment costs can be effectively reduced.

In addition, the AI parameter is determined based on the AI training requirement. Therefore, the AI data obtained based on the AI parameter can meet various actual requirements of AI training on a data type, a data volume, and the like, and problems such as a single data type, insufficient data, and a failure to select a data source that are caused by completing the AI function through the existing NGAP protocol layer procedure can be resolved, so that the network performance and running efficiency of the core network element are further improved.

The following describes in detail another communication method provided in embodiments of this application with reference to FIG. 14 to FIG. 17.

Figure 14:
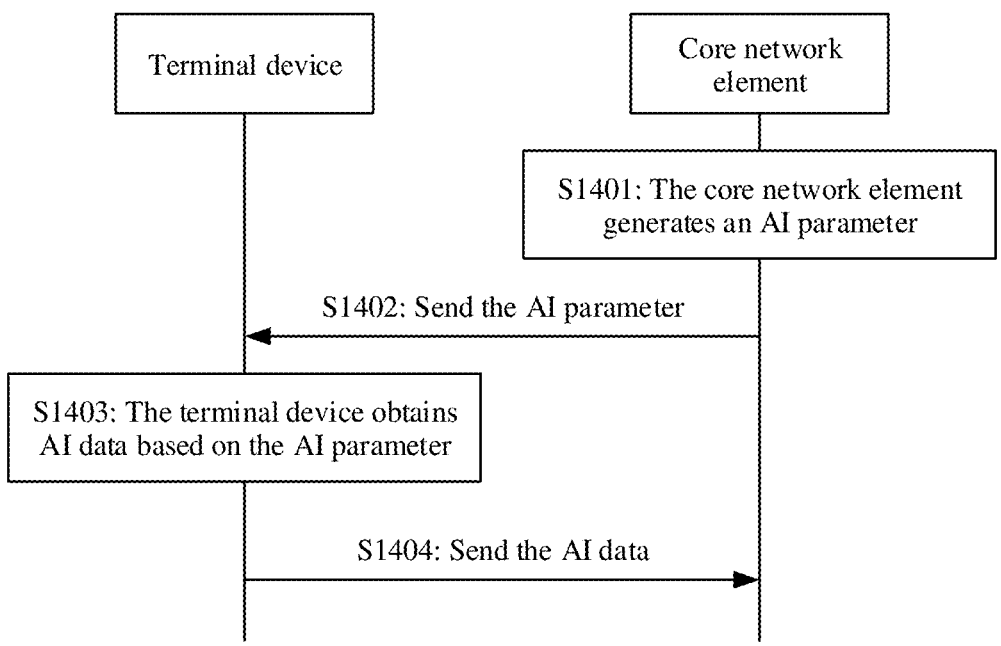
FIG. 14 is a third schematic flowchart of a communication method according to an embodiment of this application.

For example, FIG. 14 is a third schematic flowchart of a communication method according to an embodiment of this application. The communication method is applicable to communication between the core network element and the terminal device in the communication system shown in FIG. 1. As shown in FIG. 14, the communication method includes the following steps:

S1401: A core network element generates an AI parameter.

Figure 15:
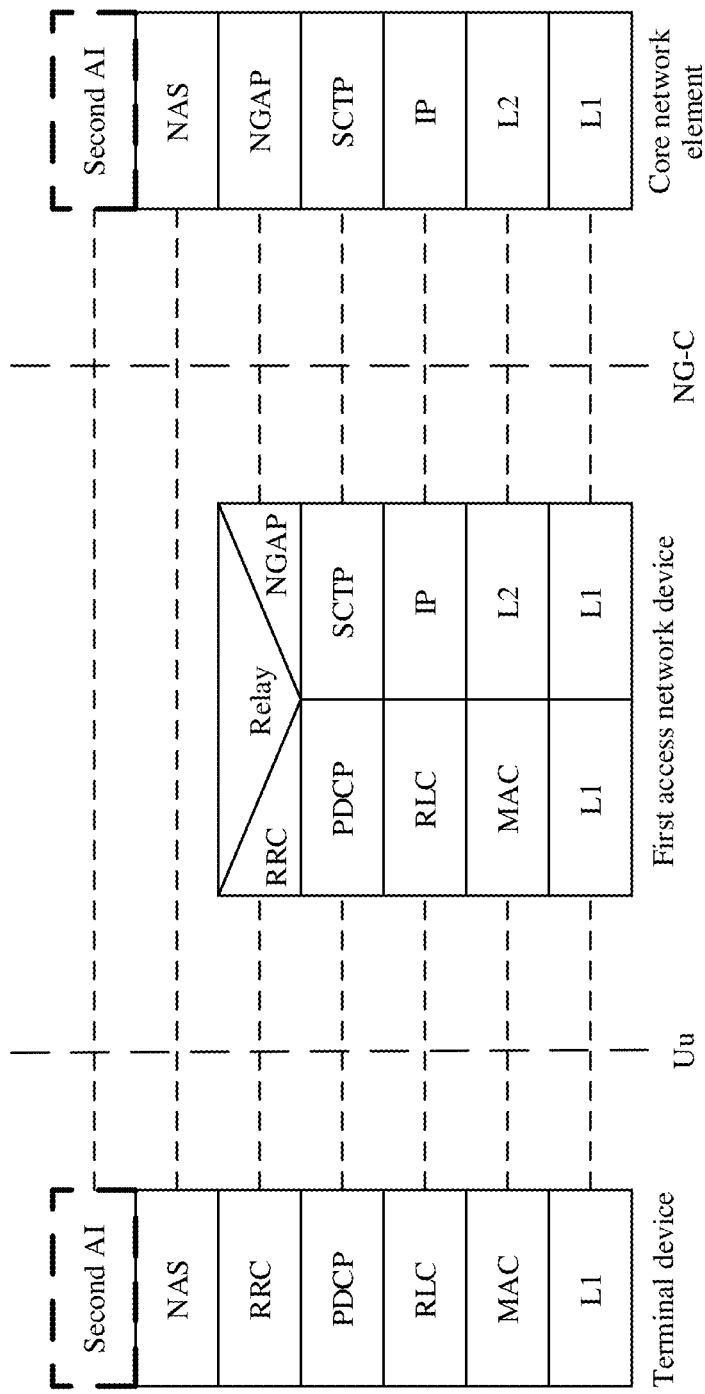
FIG. 15 is a fourth diagram of a protocol architecture according to an embodiment of this application.

For example, FIG. 15 is a fourth diagram of a protocol architecture according to an embodiment of this application. The core network element may be the core network element shown in FIG. 1, a terminal device may be any terminal device shown in FIG. 1, and a first access network device may be any access network device shown in FIG. 1. The core network element communicates with the first access network device through an NG-C interface, and the first access network device communicates with the terminal device through a Uu interface.

As shown in FIG. 15, from top to bottom, the core network element and the first access network device each include an NGAP protocol layer, a stream control transmission protocol (SCTP) layer, an internet protocol (IP) layer, an L2 protocol layer, and an L1 protocol layer. The first access network device and the terminal device each include an RRC protocol layer, a packet data convergence protocol (PDCP) layer, a radio link control (RLC) protocol layer, a media access control (MAC) protocol layer, and a physical layer (physical layer, PHY, which is also referred to as a layer 1, namely, layer 1, L1). The core network element and the terminal device each include a second AI protocol layer and a non-access stratum (NAS) protocol layer.

In other words, a second AI protocol layer of the core network element is an upper layer of a non-access stratum NAS protocol layer of the core network element. Correspondingly, a second AI protocol layer of the terminal device is an upper layer of a NAS protocol layer of the terminal device. The second AI protocol layer is an optional protocol layer (represented by a dashed-line box in FIG. 15).

Protocol layers that are of the core network element and the first access network device, of the first access network device and the terminal device, or of the core network element and the terminal device and that have a same name may be referred to as peer protocol layers. For example, an NGAP layer of the core network element and an NGAP layer of the first access network device are a pair of peer protocol layers, an RRC protocol layer of the first access network device and an RRC protocol layer of the terminal device are a pair of peer protocol layers, and the AI protocol layer of the core network element and the AI protocol layer of the terminal device are a pair of peer protocol layers. A peer protocol layer of a sender is configured to generate and send data, and a peer protocol layer of a receiver is configured to receive and parse the data sent by the sender.

In some embodiments, that a core network element generates an AI parameter in S1401 may include: The second AI protocol layer of the core network element generates the AI parameter.

Specifically, the second AI protocol layer is an independent protocol layer introduced in this embodiment of this application. The first AI protocol layer is the upper layer of the NAS protocol layer, and is configured to perform an AI function-related operation. In other words, in this embodiment of this application, an AI function is separated from a communication function, so that the AI parameter can be flexibly adjusted to meet various types of AI requirements, and the communication function is not negatively affected.

In some embodiments, that a core network element generates an AI parameter in S1401 may further include: The NAS protocol layer of the core network element generates the AI parameter.

Specifically, the NAS protocol layer is a NAS protocol layer having an AI function. The NAS protocol layer may be used to perform an AI function-related operation, to generate the AI parameter. In other words, in this embodiment of this application, the AI function may be completed through a NAS protocol layer procedure with the AI function.

AI data is data obtained based on the AI parameter, and includes but is not limited to data obtained based on the AI parameter, for example, data that can be used to improve communication performance of the terminal device such as gradient data, various measurement reports, and various communication records.

In some embodiments, the AI parameter may include a third AI parameter. The third AI parameter is for obtaining AI data of the terminal device, and the third AI parameter is sent by the core network element by using a dedicated NAS protocol layer message. Correspondingly, the third AI parameter is received by the terminal device by using the dedicated NAS protocol layer message.

The third AI parameter limits the terminal device that reports the AI data, for example, limits a type, a service type, a location, and received signal quality and/or strength of the terminal device. In this way, the core network element may send the third AI parameter to the terminal device, directly obtain the AI data from the terminal device, perform artificial intelligence analysis, and then configure a more appropriate parameter for the terminal device, so that the communication performance of the specific terminal device can be improved.

For specific implementations of sending and receiving the third AI parameter, refer to related content of specific implementations of sending and receiving the third AI parameter in S1402. Details are not described herein.

In some embodiments, the third AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume. The reporting content configuration may further include whether to report location information. The reporting content configuration may be for indicating specific AI data to be reported by the terminal device to the core network element, so that the core network element completes AI training based on the AI data.

In some embodiments, the third AI parameter may further include a reporting occasion configuration. The reporting occasion configuration includes a reporting trigger condition and a reporting periodicity. For example, the reporting trigger condition may include: serving cell signal quality is higher than or lower than a specified threshold. The reporting periodicity indicates that specified data is reported based on the specified periodicity.

S1402: The core network element sends the AI parameter to the terminal device. Correspondingly, the terminal device receives the AI parameter from the core network element.

The AI parameter is for indicating the AI data that needs to be obtained and an obtaining manner of the AI data.

In some embodiments, that the core network element sends the AI parameter to the terminal device in S1402 may include: The second AI protocol layer of the core network element sends the AI parameter to a physical layer of the core network element layer by layer in order of protocol layers from top to bottom, and the physical layer of the core network element sends the AI parameter by using a resource on the NG-C interface.

Specifically, with reference to FIG. 15, the second AI protocol layer of the core network element may encapsulate the AI parameter generated by the second AI protocol layer in S1401, for example, the third AI parameter, into a data packet, and send the data packet to the physical layer of the core network element layer by layer in order of the protocol layers from top to bottom, and the physical layer of the core network element sends the data packet by using the resource on the NG-C interface. Then, a physical layer of the first access network device receives the data packet by using the resource on the NG-C interface, and sends the data packet through the Uu interface. For a specific implementation process, refer to a current technology. Details are not described herein. The following provides detailed descriptions with reference to FIG. 15.

That the core network element sends the AI parameter to the terminal device in S1402 may include the following step 10 to step 13.

Step 10: The second AI protocol layer of the core network element encapsulates the AI parameter into a third AI protocol data unit AI PDU. The AI parameter includes the third AI parameter.

Figure 16:
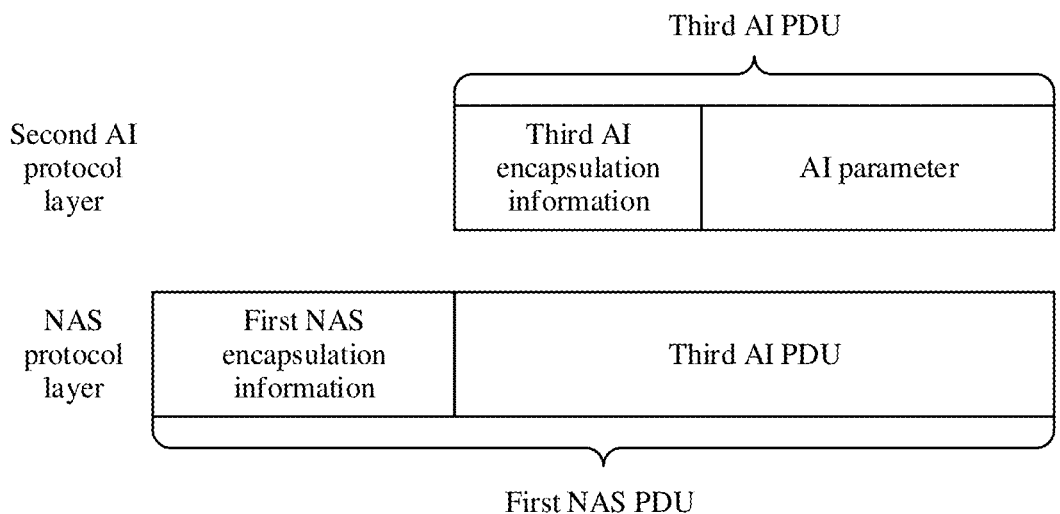
FIG. 16 is a third schematic diagram of a structure of a PDU according to an embodiment of this application.

For example, FIG. 16 is a third schematic diagram of a structure of a PDU according to an embodiment of this application. With reference to FIG. 15, as shown in FIG. 16, the second AI protocol layer of the core network element may add third AI encapsulation information to the AI parameter, to generate the third AI PDU.

It should be noted that when there are a plurality of AI parameters, fields in the third AI PDU that are specifically occupied by different AI parameters are not specifically limited in this embodiment of this application.

Step 11: The second AI protocol layer of the core network element sends the third AI PDU to the NAS protocol layer of the core network element. Correspondingly, the NAS protocol layer of the core network element receives the third AI PDU from the second AI protocol layer of the core network element.

For example, the second AI protocol layer of the core network element may send the third AI PDU to the NAS protocol layer of the core network element through an interface between the second AI protocol layer of the core network element and the NAS protocol layer of the core network element.

Step 12: The NAS protocol layer of the core network element encapsulates the third AI PDU into a first NAS PDU, and sends the first NAS PDU.

With reference to FIG. 15, as shown in FIG. 16, the NAS protocol layer of the core network element adds first NAS encapsulation information to the third AI PDU, to generate the first NAS PDU, and then sends the first NAS PDU by using a NAS message.

For example, a first NAS PDU including the third AI parameter may be sent by using the dedicated NAS protocol layer message. The dedicated NAS protocol layer message is a NAS protocol layer message that is introduced in this embodiment of this application and that is specially used for sending the third AI parameter, and is distinguished from a NAS protocol layer message related to a sending communication function, so that the AI function is further separated from the communication function.

It can be learned from step 10 to step 12 that, in this embodiment of this application, the second AI protocol layer of the core network element can be separated from an existing protocol layer of the core network element, and the AI function can be further separated from the communication function, so that flexibility of the AI function supported by the core network element can be improved. In addition, the existing protocol layer does not need to perform an AI-related operation, so that impact of the AI function on the communication function can be reduced, and technical complexity of the core network element can be reduced, to reduce development costs and deployment costs of the core network element.

In correspondence to step 10 to step 12 in which the core network element sends the AI parameter at the protocol layers shown in FIG. 15 from top to bottom, the terminal device may receive and parse the AI parameter at protocol layers shown in FIG. 15 from bottom to top. Specifically, that the terminal device receives the artificial intelligence AI parameter from the core network element in S1402 may include the following step 13 to step 15.

Step 13: The NAS protocol layer of the terminal device receives the first NAS PDU, and parses the first NAS encapsulation information to obtain the third AI PDU.

For a specific implementation, refer to the foregoing step 12. Details are not described herein again.

Step 14: The NAS protocol layer of the terminal device sends the third AI PDU to the second AI protocol layer of the terminal device. Correspondingly, the second AI protocol layer of the terminal device receives the third AI PDU from the NAS protocol layer of the terminal device.

For a specific implementation, refer to the foregoing step 11. Details are not described herein again.

Step 15: The second AI protocol layer of the terminal device parses the third AI PDU to obtain the AI parameter.

For a specific implementation, refer to the foregoing step 10. Details are not described herein again.

In some embodiments, that the core network element sends the AI parameter to the terminal device in S1402 may include: The NAS protocol layer of the core network element sends the AI parameter to a physical layer of the core network element layer by layer in order of protocol layers from top to bottom, and the physical layer of the core network element sends the AI parameter by using a resource on the NG-C interface.

In some embodiments, the third AI parameter may be sent by using the dedicated NAS protocol layer message. The dedicated NAS protocol layer message is a NAS protocol layer message that is introduced in this embodiment of this application and that is specially used for sending the third AI parameter, and is distinguished from a NAS protocol layer message related to a sending communication function, so that the AI function is separated from the communication function.

Correspondingly, that the terminal device receives the AI parameter from the core network element in S1402 may further include: The terminal device may receive and parse the AI parameter at protocol layers shown in FIG. 15 from bottom to top, that is, a physical layer to the NAS layer sequentially receive and parse the AI parameter, and the NAS protocol layer obtains the AI parameter.

In some embodiments, the third AI parameter may be received by using the dedicated NAS protocol layer message. The dedicated NAS protocol layer message is a NAS protocol layer message that is introduced in this embodiment of this application and that is specially used for receiving the third AI parameter, and is distinguished from a NAS protocol layer message related to a receiving communication function, so that an AI function is separated from a communication function.

S1403: The terminal device obtains the AI data based on the AI parameter

In some embodiments, that the terminal device obtains the AI data based on the AI parameter in S1403 may include: The second AI protocol layer of the terminal device obtains the AI data based on the AI parameter.

In some embodiments, that the terminal device obtains the AI data based on the AI parameter in S1403 may include: The NAS protocol layer of the terminal device obtains the AI data based on the AI parameter.

For example, the terminal device may perform a training task and/or a collection task based on the reporting content configuration and the reporting occasion configuration that are included in the third AI parameter, and report a training result and/or collected data to the core network element. For content of the AI data and a specific implementation of the obtaining manner of the AI data, refer to related content in S1401. Details are not described herein again.

S1404: The terminal device sends the AI data to the core network element. Correspondingly, the core network element receives the AI data from the terminal device.

In some embodiments, that the terminal device sends the AI data to the core network element in S1404 may include the following step 16 to step 18.

Step 16: The second AI protocol layer of the terminal device encapsulates the AI data into a fourth AI protocol data unit AI PDU.

Figure 17:
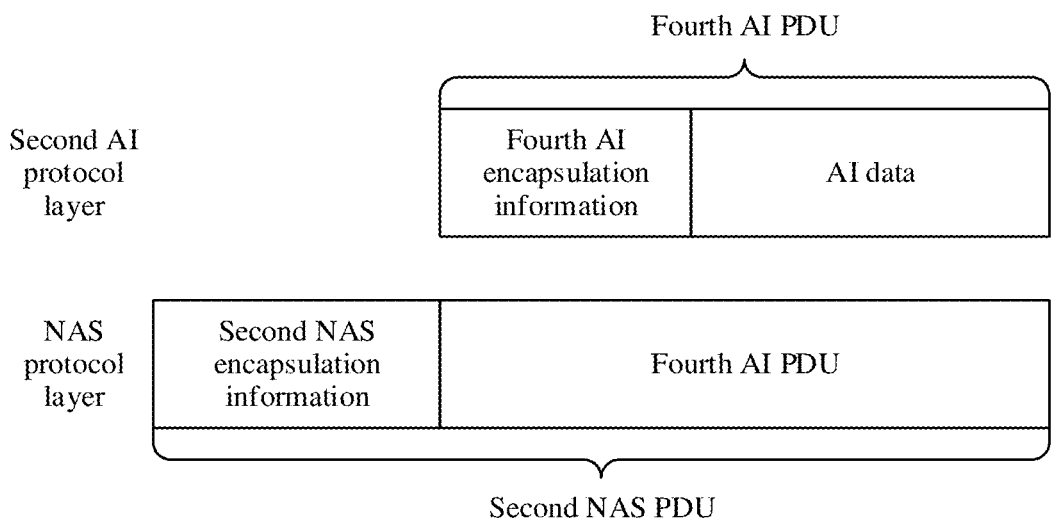
FIG. 17 is a fourth schematic diagram of a structure of a PDU according to an embodiment of this application.

For example, FIG. 17 is a fourth schematic diagram of a structure of a PDU according to an embodiment of this application. With reference to FIG. 15, as shown in FIG. 17, the second AI protocol layer of the terminal device may add fourth AI encapsulation information to the AI data, to generate the fourth AI PDU.

Step 17: The second AI protocol layer of the terminal device sends the fourth AI PDU to the NAS protocol layer of the terminal device. Correspondingly, the NAS protocol layer of the terminal device receives the fourth AI PDU from the second AI protocol layer of the terminal device.

For example, the second AI protocol layer of the terminal device may send the fourth AI PDU to the NAS protocol layer of the terminal device through an interface between the second AI protocol layer of the terminal device and the NAS protocol layer of the terminal device.

Step 18: The NAS protocol layer of the terminal device adds second NAS encapsulation information to the fourth AI PDU, and sends the fourth AI PDU.

Specifically, with reference to FIG. 15, as shown in FIG. 17, the NAS protocol layer of the terminal device may add the second NAS encapsulation information to the fourth AI PDU, to generate a second NAS PDU, and then send the second NAS PDU by using a NAS protocol layer message.

It can be learned from step 16 to step 18 that, in this embodiment of this application, the AI protocol layer of the terminal device can be separated from an existing protocol layer of the terminal device, and the AI function can be further separated from the communication function, so that flexibility of the AI function supported by the terminal device can be improved. In addition, the existing protocol layer does not need to perform an AI-related operation, so that impact of the AI function on the communication function can be reduced, and technical complexity of the terminal device can be reduced, to reduce costs of the terminal device.

In some embodiments, that the terminal device sends the AI data to the core network element in S1404 may further include: The NAS protocol layer of the terminal device sends the AI data to the physical layer of the terminal device layer by layer in order of the protocol layers from top to bottom, and the physical layer of the terminal device sends the AI data by using a resource on the Uu interface. The AI parameter includes the third AI parameter.

In some embodiments, for the core network element, the first AI protocol layer configured to interact with the first access network device and the second AI protocol layer configured to interact with the terminal device may be a same AI protocol layer. In other words, the AI protocol layer is not only an upper layer of the NGAP protocol layer, but also an upper layer of the NAS protocol layer. An AI PDU of the AI protocol layer may be directly sent to the NGAP protocol layer to interact with the first access network device, and may be directly sent to the NAS protocol layer to interact with the terminal device. In other words, for the core network element, an AI function corresponding to an access network and an AI function corresponding to the terminal device are implemented at a same AI protocol layer.

In some embodiments, the core network element may alternatively have two AI protocol layers. One AI protocol layer may send an AI PDU to the NGAP protocol layer, to interact with the first access network device. The other AI protocol layer may send the AI PDU to the NAS protocol layer, to interact with the terminal device.

Based on the communication method shown in FIG. 14, an independent AI protocol layer is introduced above the existing protocol layer of the core network element, so that a type of the AI function and a quantity of AI functions supported by the core network element can be flexibly adjusted based on an actual AI training requirement. For example, a new AI function is introduced, or an original AI function is modified, deleted, or recombined. In addition, the communication function of the core network element can be separated from the AI function of the core network element. For example, AI functions such as generating the AI parameter, receiving and parsing the AI data reported by the first access network device, and completing a network optimization operation based on the AI data are completed by the AI protocol layer of the core network element. However, an original protocol layer of the core network element, for example, the NAS protocol layer, only needs to implement the communication function, and does not need to perform an AI function-related operation. In this way, a problem that the AI function is bound to an existing NAS protocol layer procedure such as minimization of drive tests because the AI function is completed through the existing NAS protocol layer procedure can be resolved. Therefore, diversity and flexibility of the AI function supported by the core network element are improved, and network performance of the core network element is improved. In addition, the original protocol layer does not need to be modified, and a technical difficulty in implementing the AI function is low, so that an existing protocol is not affected, and device development costs and network deployment costs can be effectively reduced.

In addition, the AI parameter is determined based on the AI training requirement. Therefore, the AI data obtained based on the AI parameter can meet various actual requirements of AI training on a data type, a data volume, and the like, and problems such as a single data type, insufficient data, and a failure to select a data source that are caused by completing the AI function through the existing NAS protocol layer procedure can be resolved, so that accuracy and efficiency of the AI training are further improved.

The foregoing describes in detail the communication methods provided in embodiments of this application with reference to FIG. 3 to FIG. 17. The following describes in detail another two communication apparatuses provided in embodiments of this application with reference to FIG. 18 and FIG. 19.

Figure 18:
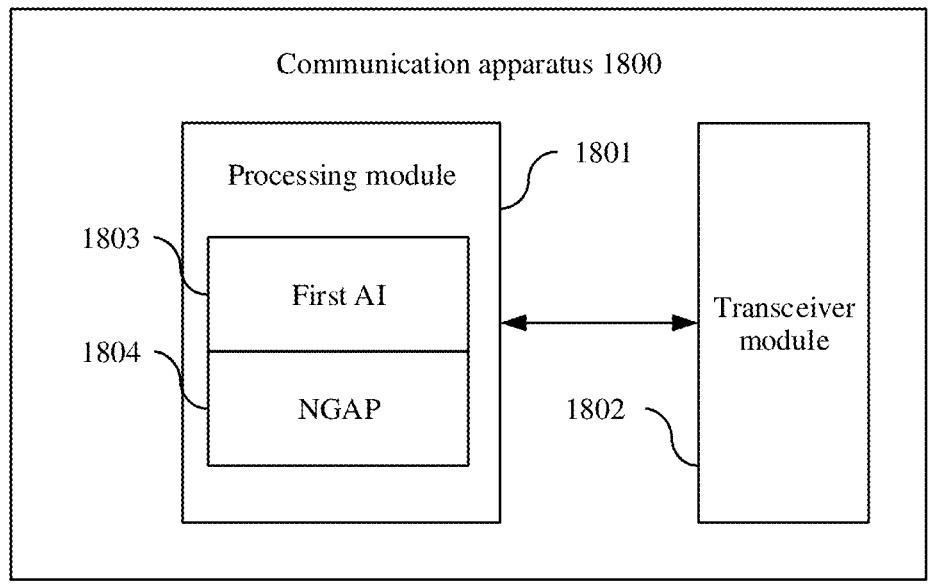
FIG. 18 is a second schematic diagram of a structure of a communication apparatus according to an embodiment of this application.

FIG. 18 is a second schematic diagram of a structure of a communication apparatus according to an embodiment of this application. As shown in FIG. 18, the communication apparatus 1800 includes a processing module 1801 and a transceiver module 1802. The processing module 1801 includes a first artificial intelligence AI protocol layer and a next generation application protocol NGAP protocol layer of the communication apparatus 1800. The first AI protocol layer of the communication apparatus 1800 is an upper layer of the NGAP protocol layer of the communication apparatus 1800. For ease of description, FIG. 18 shows only main components of the communication apparatus 1800.

In some embodiments, the communication apparatus 1800 shown in FIG. 18 is applicable to the communication system shown in FIG. 1, and performs functions of the core network element in the communication method shown in FIG. 3.

The first AI protocol layer of the communication apparatus 1800 is configured to generate an AI parameter.

The transceiver module 1802 is configured to send the AI parameter to a first access network device. The AI parameter is for indicating AI data that needs to be obtained and an obtaining manner of the AI data.

The transceiver module 1802 is further configured to receive the AI data from the first access network device.

In some embodiments, the first AI protocol layer 1803 of the communication apparatus 1800 is further configured to: after the first AI protocol layer of the communication apparatus 1800 generates the AI parameter, encapsulate the AI parameter into a first AI protocol data unit AI PDU; and the first AI protocol layer 1803 of the communication apparatus 1800 is further configured to send the first AI PDU to the NGAP protocol layer 1804 of the communication apparatus 1800.

In some embodiments, the AI parameter may include a first AI parameter. The first AI parameter is sent by using an NGAP protocol layer message that is not associated with a terminal device.

Further, the first AI parameter may include a reporting content configuration. The reporting content configuration may include one or more of the following: a serving cell measurement result and/or a beam measurement result, radio link failure information, connection setup failure information, an uplink transmission delay, a downlink transmission delay, and a data transmission volume.

For example, the first AI parameter may further include a reporting occasion configuration. The reporting occasion configuration includes a reporting trigger condition and a reporting periodicity.

For example, the first AI parameter may further include a user selection configuration. The user selection configuration is for indicating a condition that needs to be met by a to-be-selected terminal device.

For example, the first AI parameter may further include an anonymization configuration. The anonymization configuration includes information indicating whether the AI data is reported anonymously, and/or an anonymization level configuration.

In some embodiments, the transceiver module 1802 is further configured to send privacy restriction information of the terminal device to the first access network device. The privacy restriction information includes one or more of the following: whether collection of data of the terminal device is allowed, whether the data of the terminal device is anonymous, anonymization level information, and whether collection of location information of the terminal device is allowed.

In some embodiments, the privacy restriction information is sent by using an initial context setup request message.

In some embodiments, the AI parameter may further include a second AI parameter. The second AI parameter is for obtaining AI data of a specific terminal device, and the second AI parameter is sent by using an NGAP protocol layer message that is associated with the terminal device.

In some embodiments, the communication apparatus 1800 may further include a storage module (not shown in FIG. 18). The storage module stores a program or instructions. When the processing module 1801 executes the program or the instructions, the communication apparatus 1800 is enabled to perform the functions of the core network element in the communication method shown in FIG. 3.

It should be noted that the communication apparatus 1800 may be a core network element, or may be a chip or a chip system disposed in the core network element. This is not limited in this application.

In addition, for technical effects of the communication apparatus 1800, refer to the technical effects of the communication method shown in FIG. 3. Details are not described herein again.

In some embodiments, the communication apparatus 1800 shown in FIG. 18 is applicable to the communication system shown in FIG. 1, and performs functions of the first access network device in the communication method shown in FIG. 3.

The transceiver module 1802 is configured to receive an artificial intelligence AI parameter from a core network element. The AI parameter is for indicating AI data that needs to be obtained and an obtaining manner of the AI data.

The first AI protocol layer 1803 of the communication apparatus 1800 is configured to obtain the AI data based on the AI parameter.

The transceiver module 1802 is further configured to send the AI data to the core network element.

In some embodiments, the first AI protocol layer 1803 of the communication apparatus 1800 is further configured to: after the first AI protocol layer 1803 of the communication apparatus 1800 obtains the AI data based on the AI parameter, encapsulate the AI data into a second AI protocol data unit AI PDU; and the first AI protocol layer 1803 of the communication apparatus 1800 is further configured to send the second AI PDU to the NGAP protocol layer 1804 of the communication apparatus 1800.

In some embodiments, the AI parameter includes a first AI parameter. The first AI parameter is received by using an NGAP protocol layer message that is not associated with a terminal device.

Further, the first AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume.

For example, the first AI parameter may further include a reporting occasion configuration. The reporting occasion configuration includes a reporting trigger condition and a reporting periodicity.

For example, the first AI parameter may further include a user selection configuration. The user selection configuration is for indicating a condition that needs to be met by a to-be-selected terminal device.

For example, the first AI parameter may further include an anonymization configuration. The anonymization configuration includes information indicating whether the AI data is reported anonymously, and/or an anonymization level configuration.

In some embodiments, the transceiver module 1802 is further configured to receive privacy restriction information of the terminal device from the core network element. The privacy restriction information includes one or more of the following: whether collection of data of the terminal device is allowed, whether the data of the terminal device is anonymous, anonymization level information, and whether collection of location information of the terminal device is allowed.

In some embodiments, the privacy restriction information is received by using an initial context setup request message.

In some embodiments, the transceiver module 1802 is further configured to send a handover request message to a second access network device. The handover request message carries the privacy restriction information.

In some embodiments, the AI parameter may further include a second AI parameter. The second AI parameter is for obtaining AI data of a specific terminal device, and the second AI parameter is received by using an NGAP protocol layer message that is associated with the terminal device.

In some embodiments, the communication apparatus 1800 includes a radio access network intelligent controller RIC and a centralized unit CU. The first AI protocol layer of the communication apparatus 1800 is located in the RIC or the CU.

It should be understood that the communication apparatus 1800 may alternatively use another physical architecture.

For example, the communication apparatus 1800 includes a CU and a DU, and the AI layer of the communication apparatus 1800 is located in the CU; or the communication apparatus 1800 is not divided into a CU and a DU, in other words, both the AI layer and an original protocol layer of the communication apparatus 1800 are located in a same physical device. An implementation of the communication apparatus 1800 is not specifically limited in this embodiment of this application.

Figure 19:
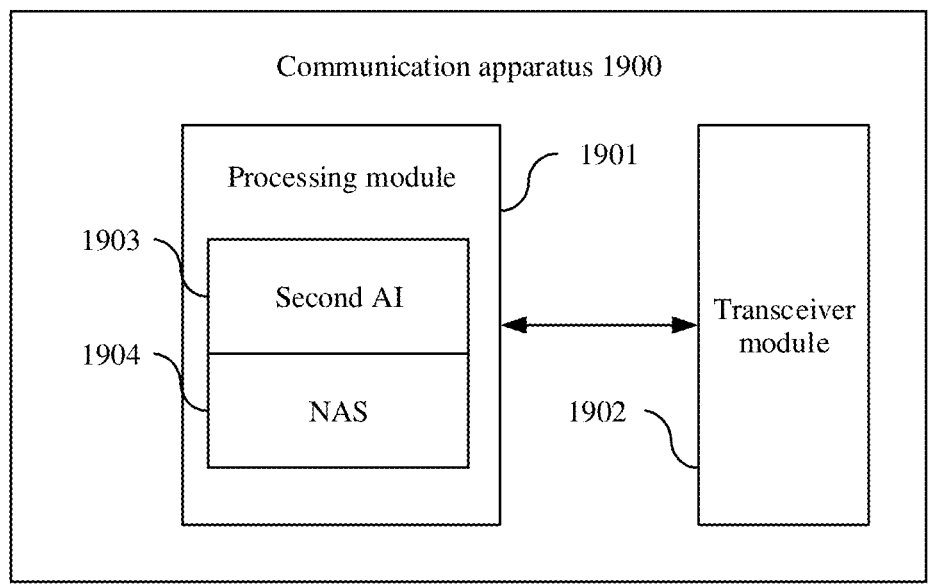
FIG. 19 is a third schematic diagram of a structure of a communication apparatus according to an embodiment of this application.

FIG. 19 is a third schematic diagram of a structure of a communication apparatus according to an embodiment of this application. As shown in FIG. 19, the communication apparatus 1900 includes a processing module 1901 and a transceiver module 1902. The processing module 1901 includes a second artificial intelligence AI protocol layer 1903 and a non-access stratum NAS protocol layer 1904 of the communication apparatus 1900. The second AI protocol layer 1903 of the communication apparatus 1900 is an upper layer of the non-access stratum NAS protocol layer 1904 of the communication apparatus 1900. For ease of description, FIG. 19 shows only main components of the communication apparatus 1900.

In some embodiments, the communication apparatus 1900 shown in FIG. 19 is applicable to the communication system shown in FIG. 1, and performs functions of the core network element in the communication method shown in FIG. 14.

The second AI protocol layer 1903 of the communication apparatus 1900 is configured to generate an AI parameter.

The transceiver module 1902 is configured to send the AI parameter to a terminal device. The AI parameter is for indicating AI data that needs to be obtained and an obtaining manner of the AI data.

The transceiver module 1902 is further configured to receive the AI data from the terminal device.

In some embodiments, the second AI protocol layer 1903 of the communication apparatus 1900 shown in FIG. 19 is further configured to: after the second AI protocol layer 1903 of the communication apparatus 1900 generates the AI parameter, encapsulate the AI parameter into a third AI protocol data unit AI PDU; and the second AI protocol layer 1903 of the communication apparatus 1900 is further configured to send the third AI PDU to the NAS protocol layer 1904 of the communication apparatus 1900.

In some embodiments, the AI parameter may include a third AI parameter. The third AI parameter is for obtaining the AI data of the terminal device, and the third AI parameter is sent by using a dedicated NAS protocol layer message.

Further, the third AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume.

For example, the third AI parameter may further include a reporting occasion configuration. The reporting occasion configuration includes a reporting trigger condition and a reporting periodicity.

In some embodiments, the communication apparatus 1900 may further include a storage module (not shown in FIG. 19). The storage module stores a program or instructions. When the processing module 1901 executes the program or the instructions, the communication apparatus 1900 is enabled to perform the functions of the core network element in the communication method shown in FIG. 14.

It should be noted that the communication apparatus 1900 may be a core network element, or may be a chip or a chip system disposed in the core network element. This is not limited in this application.

In addition, for technical effects of the communication apparatus 1900, refer to the technical effects of the communication method shown in FIG. 3. Details are not described herein again.

In some embodiments, the communication apparatus 1900 shown in FIG. 19 is applicable to the communication system shown in FIG. 1, and performs functions of the terminal device in the communication method shown in FIG. 14.

The transceiver module 1902 is configured to receive an artificial intelligence AI parameter from a core network element. The AI parameter is for indicating AI data that needs to be obtained and an obtaining manner of the AI data.

The second AI protocol layer 1903 of the communication apparatus 1900 is configured to obtain the AI data based on the AI parameter.

The transceiver module 1902 is further configured to send the AI data to the core network element.

In some embodiments, the second AI protocol layer 1903 of the communication apparatus 1900 is further configured to: after the second AI protocol layer 1903 of the communication apparatus 1900 obtains the AI data based on the AI parameter, encapsulate the AI data into a fourth AI protocol data unit AI PDU; and the second AI protocol layer 1903 of the communication apparatus 1900 is further configured to send the fourth AI PDU to the NAS protocol layer 1904 of the communication apparatus 1900.

In some embodiments, the AI parameter may include a third AI parameter. The third AI parameter is for obtaining the AI data of the communication apparatus 1900, and the third AI parameter is received by using a dedicated NAS protocol layer message.

Further, the third AI parameter may include a reporting content configuration. The reporting content configuration includes one or more of the following: a serving cell measurement result and/or a beam measurement result, radio link failure information, connection setup failure information, an uplink transmission delay, a downlink transmission delay, and a data transmission volume.

For example, the third AI parameter includes a reporting occasion configuration. The reporting occasion configuration includes a reporting trigger condition and a reporting periodicity.

In some embodiments, the communication apparatus 1900 may further include a storage module (not shown in FIG. 19). The storage module stores a program or instructions. When the processing module 1901 executes the program or the instructions, the communication apparatus 1900 is enabled to perform the functions of the terminal device in the communication method shown in FIG. 14.

It should be noted that the communication apparatus 1900 may be a terminal device, or may be a chip or a chip system disposed in the terminal device. This is not limited in this application.

In addition, for technical effects of the communication apparatus 1900, refer to the technical effects of the communication method shown in FIG. 3. Details are not described herein again.

An embodiment of this application provides a chip system. The chip system includes a processor and an input/output port. The processor is configured to implement a processing function in the foregoing method embodiments, and the input/output port is configured to implement a transceiver function in the foregoing method embodiments.

In some embodiments, the chip system further includes a memory. The memory is configured to store program instructions and data for implementing functions in the foregoing method embodiments.

The chip system may include a chip, or may include a chip and another discrete component.

An embodiment of this application provides a communication system. The communication system includes a core network element, an access network device, and a terminal device.

An embodiment of this application provides a computer-readable storage medium. The computer-readable storage medium includes a computer program or instructions. When the computer program or the instructions are run on a computer, the computer is enabled to perform the communication method in the foregoing method embodiments.

An embodiment of this application provides a computer program product, including a computer program or instructions. When the computer program or the instructions are run on a computer, the computer is enabled to perform the communication method in the foregoing method embodiments.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any processor or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any combination thereof. When software is used to implement the embodiments, the embodiments may be implemented completely or partially in a form of a computer program product. The computer program product includes one or more computer instructions or computer programs. When the computer instructions or the computer programs are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification usually indicates an "or" relationship between the associated objects, or may indicate an "and/or" relationship. A specific meaning depends on a context.

In this application, "at least one" refers to one or more, and "a plurality of" refers to two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the units and algorithm steps in the examples described in the embodiments disclosed in this specification, this application can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A core network element, comprising:
   a processor; and
   a non-transitory memory coupled to the processor, the non-transitory memory being configured to store non-transitory instructions, and in response to being executed by the processor, cause the core network element to perform operations comprising:
   generating, by a first artificial intelligence (AI) protocol layer of the core network element, an AI parameter, wherein the first AI protocol layer of the core network element is an upper layer of a next generation application protocol (NGAP) protocol layer of the core network element;
   sending the AI parameter to a first access network device, wherein the AI parameter is useable for indicating AI data that is to be obtained and an obtaining manner of the AI data; and
   receiving the AI data from the first access network device.

2. The core network element according to claim 1, wherein the operations further comprise:
   after the generating the AI parameter,
      encapsulating, by the first AI protocol layer of the core network element, the AI parameter into a first AI protocol data unit (AI PDU); and sending, by the first AI protocol layer of the core network element, the first AI PDU to the NGAP protocol layer of the core network element.

3. The core network element according to claim 1, wherein the AI parameter comprises a first AI parameter, and the first AI parameter is sent by an NGAP protocol layer message that is not associated with a terminal device.

4. The core network element according to claim 3, wherein the first AI parameter comprises a reporting content configuration, and the reporting content configuration comprises at least one of:
a serving cell measurement result, a beam measurement result, radio link failure information, connection setup failure information, an uplink transmission delay, a downlink transmission delay, or a data transmission volume.

5. The core network element according to claim 1, wherein the operations further comprise:
sending privacy restriction information of a terminal device to the first access network device, wherein the privacy restriction information comprises at least one of:
a first privacy parameter that indicates whether collection of data of the terminal device is allowed, a second privacy parameter that indicates whether the data of the terminal device is anonymous, anonymization level information, or a third privacy parameter that indicates whether collection of location information of the terminal device is allowed.

6. A first access network device, comprising:
a processor; and
a non-transitory memory coupled to the processor, the non-transitory memory being configured to store non-transitory instructions, and in response to being executed by the processor, cause the first access network device to perform operations comprising:
receiving an artificial intelligence (AI) parameter from a core network element, wherein the AI parameter is useable for indicating AI data that is to be obtained and an obtaining manner of the AI data;
obtaining, by a first AI protocol layer of the first access network device, the AI data based on the AI parameter, wherein the first AI protocol layer of the first access network device is an upper layer of a next generation application protocol (NGAP) protocol layer of the first access network device; and
sending the AI data to the core network element.

7. The first access network device according to claim 6, wherein the operations further comprise:
after the obtaining the AI data,
encapsulating, by the first AI protocol layer of the first access network device, the AI data into a second AI protocol data unit (AI PDU); and
sending, by the first AI protocol layer of the first access network device, the second AI PDU to the NGAP protocol layer of the first access network device.

8. The first access network device according to claim 6, wherein the AI parameter comprises a first AI parameter, and the first AI parameter is received by a NGAP protocol layer message that is not associated with a terminal device.

9. The first access network device according to claim 8, wherein the first AI parameter comprises a reporting content configuration, and the reporting content configuration comprises at least one of:
a serving cell measurement result, a beam measurement result, radio link failure information, connection setup failure information, an uplink transmission delay, a downlink transmission delay, or a data transmission volume.

10. The first access network device according to claim 6, wherein the operations further comprise:
receiving privacy restriction information of a terminal device from the core network element, wherein the privacy restriction information comprises at least one of:
a first privacy parameter that indicates whether collection of data of the terminal device is allowed, a second privacy parameter that indicates whether the data of the terminal device is anonymous, anonymization level information, or a third privacy parameter that indicates whether collection of location information of the terminal device is allowed.

11. A terminal device, comprising:
a processor; and
a non-transitory memory coupled to the processor, the non-transitory memory configured to store non-transitory instructions, and in response to being executed by the processor, cause the terminal device to perform operations comprising:
receiving an artificial intelligence (AI) parameter from a core network element, wherein the AI parameter is useable for indicating AI data that is to be obtained and an obtaining manner of the AI data;
obtaining, by a second AI protocol layer of the terminal device, the AI data based on the AI parameter, wherein the second AI protocol layer of the terminal device is an upper layer of a non-access stratum (NAS) protocol layer of the terminal device; and
sending the AI data to the core network element.

12. The terminal device according to claim 11, wherein the operations further comprise:
after the obtaining the AI data,
encapsulating, by the second AI protocol layer of the terminal device, the AI data into a fourth AI protocol data unit (AI PDU); and
sending, by the second AI protocol layer of the terminal device, the fourth AI PDU to the NAS protocol layer of the terminal device.

13. The terminal device according to claim 11, wherein the AI parameter comprises a third AI parameter, the third AI parameter is useable for obtaining the AI data of the terminal device, and the third AI parameter is sent by a dedicated NAS protocol layer message.

* * * * *